US008499538B2

(12) United States Patent
Menichetti et al.

(10) Patent No.: US 8,499,538 B2
(45) Date of Patent: *Aug. 6, 2013

(54) ADJUSTABLE AND FOLDABLE V-SHAPED HAY RAKE

(75) Inventors: Silvano Menichetti, Umbertide (IT); Sauro Petturiti, Città di Castello (IT)

(73) Assignee: SITREX S.p.A., Trestina (PG) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,191

(22) Filed: Aug. 15, 2011

(65) Prior Publication Data

US 2011/0298197 A1  Dec. 8, 2011

Related U.S. Application Data

(63) Continuation of application No. 12/228,055, filed on Aug. 7, 2008, now Pat. No. 8,001,755.

(51) Int. Cl.
*A01D 78/00* (2006.01)

(52) U.S. Cl.
USPC ............................................. 56/377; 56/378

(58) Field of Classification Search
USPC .................. 56/341, 344, 365, 366, 370, 371, 56/375–392
See application file for complete search history.

(56) References Cited

U.S. PATENT DOCUMENTS

| 4,183,198 | A | 1/1980 | Sligter |
| 4,214,428 | A | 7/1980 | Caraway |
| 4,753,063 | A | 6/1988 | Buck |
| 4,974,407 | A | 12/1990 | Rowe et al. |
| 4,977,734 | A | 12/1990 | Rowe et al. |
| 5,062,260 | A | 11/1991 | Tonutti |
| 5,127,216 | A | 7/1992 | Kelderman |
| 5,956,934 | A | 9/1999 | Wright et al. |
| 6,000,207 | A | 12/1999 | Menichetti et al. |
| 6,405,517 | B1 | 6/2002 | Peeters et al. |
| 6,543,212 | B2 * | 4/2003 | Tonutti ........................ 56/375 |
| 6,959,531 | B2 | 11/2005 | Magnini |
| 7,165,386 | B2 | 1/2007 | Tonutti |
| 7,318,312 | B2 | 1/2008 | Cicci et al. |
| 7,540,139 | B2 * | 6/2009 | Rowse et al. ............... 56/377 |
| 7,712,297 | B1 | 5/2010 | Giovannini et al. |

* cited by examiner

*Primary Examiner* — Alicia Torres
(74) *Attorney, Agent, or Firm* — Kenyon & Kenyon LLP

(57) ABSTRACT

The adjustable and foldable V-shaped hay rake which is the object of this invention is an agricultural tool used for raking hay on fields, in which, for each arm of the hay rake, all the mechanisms for moving the arm are centered on a single master support plate, that can simultaneously, both be very effectively used and easily adjusted, as well as providing the advantages of great simplicity of construction, great strength and a very economical cost of production.

19 Claims, 21 Drawing Sheets

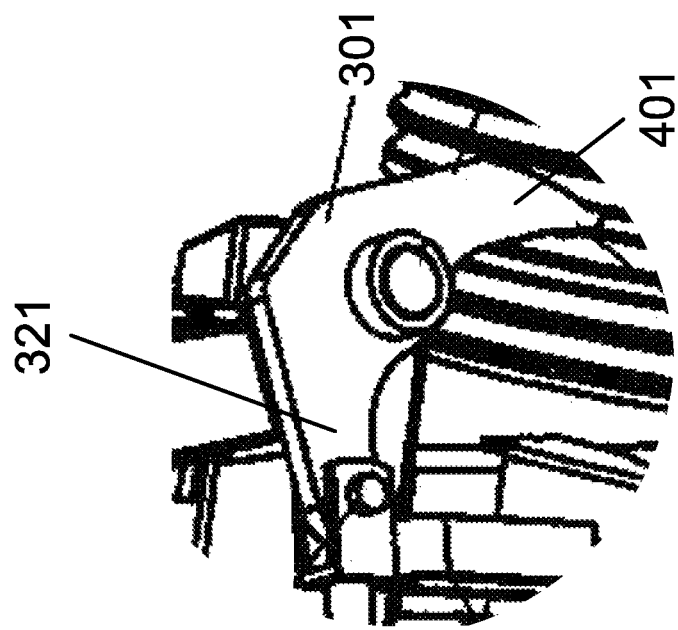
FIG. 5c (Section B)
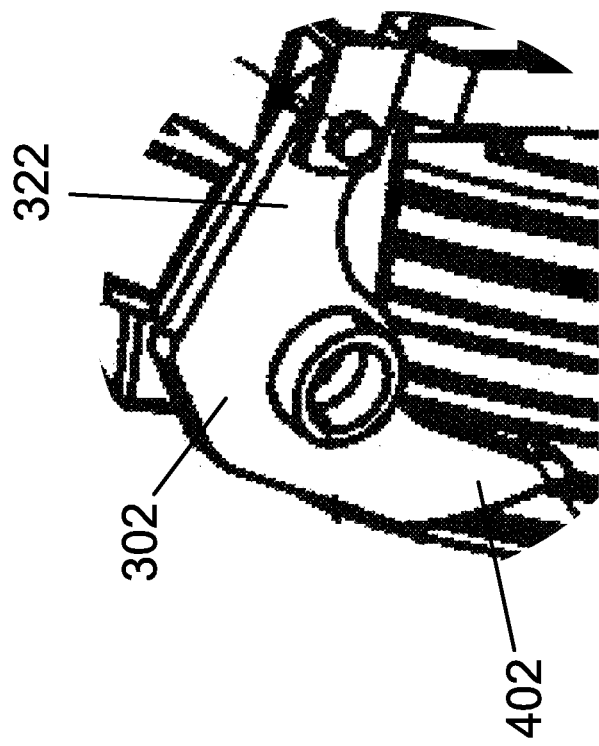
FIG. 5b (Section A)

ADJUSTABLE AND FOLDABLE V-SHAPED HAY RAKE

RELATED APPLICATIONS

This application is a continuation of prior U.S. application Ser. No. 12/228,055, filed on Aug. 7, 2008, now U.S. Pat. No. 8,001,755 which is incorporated herein by reference in its entirety.

FIELD OF THE INVENTION

The present invention concerns an agricultural tool used for gathering hay. More particularly, it relates to a towable adjustable and foldable V-shaped hay rake.

BACKGROUND INFORMATION

Towable hay rakes having two adjustable rake arms provided with hay raking wheels, in which the rake arms are movable, usually by the action of one or more hydraulic cylinders, from a folded transport position to a working "V" position for gathering hay in the field are known. Such towable hay rakes include, for example, those described in U.S. Pat. Nos. 4,183,198, 4,214,428, 4,753,063, 4,974,407, 4,977,734, 6,405,517 and 7,318,312.

None of the hay rakes available so far, however, is entirely satisfactory from all points of view. While they all may be successful with respect to accomplishing the hay gathering task for which they were designed, they also may be more complex and expensive than is desirable given the great need for these important agricultural tools.

SUMMARY

These problems and inconveniences may be addressed by the hay rake described herein, which, because of its innovative design, not only is highly effective in its hay gathering capacity, but is also more robust, simpler, and thus less expensive to build and easier to operate.

According to an example embodiment of the present invention, a hay rake includes: a central frame; at least two wheels attached to the central frame; a tow bar attached to the central frame and extending in a frontward direction from the central frame; and a wing assembly including an arm coupled to the central frame by a pivot joint defining a pivot axis about which the wing assembly is rotatable with respect to the central frame, a wing coupled in a fixed position to an end of the arm opposite the pivot joint such that the only degree of freedom between the wing and the central frame is rotation about the pivot axis, the wing arranged for mounting a plurality of hay rake wheels along a length of the wing, and an arm actuator mount fixedly coupled to the arm. The rake includes a wing actuator having a first end coupled to the arm actuator mount and a second end coupled to the central frame, the actuator being arranged to actuate the wing assembly between an outward position and an upward position. Preferably, the wing is horizontal and angled outwardly in the frontward direction when the wing assembly is in the outward position, and the pivot axis is skewed such that the wing is horizontal and parallel to the forward direction when the wing assembly is in the upward position.

The arm may be arranged such that any adjustments to the wing orientation may be effected at the arm without the need for additional components such as, e.g., support members that attach to the wing and to the arm and/or central frame to set the wing angle. For example, according to some examples of the present invention, the angle of the wing with respect to the arm and/or central frame and the distance of the wing from the central frame may be altered solely by making adjustments on the arm, such as, e.g., moving a pin between different holes in the arm. In this manner, the distance of the wing from the central frame may be altered by telescoping the arm and setting the arm length with a pin that is inserted through holes in each of the telescoping sections of the arm, and the angle of the wing may be adjusted by rotating the wing and fixing the rotational position by inserting a single pin through both a hole in the arm and a hole in the wing. Further, as the rotation of the wing assembly between the upward position and the outward position may occur at a single joint at the end of the arm opposite the wing, all movement and adjustments of the wing with respect to the central frame may occur via a single arm, thus providing a highly flexible system with a relatively small number of parts. This relatively low level of complexity may allow for lower manufacturing costs and less potential points of failure from a reliability standpoint.

The hay rake may also include a spring structure arranged to engage the wing assembly when the wing assembly is in the outward position so as to apply a spring force against downward rotation of the wing assembly about the arm pivot axis. The spring structure may include a spring and an engagement element, the spring coupled to the central frame and the engagement element, wherein the wing assembly further includes a spring hook arranged to engage the engagement element when the wing assembly is moved from the upward position to the outward position. The engagement of the engagement element by the spring hook may pull the engagement element in a direction away from the spring. The spring hook and the arm actuator mount may be integrally formed as a single piece. The engagement element may be an eye bolt. The spring hook and the arm actuator mount may be formed as a plate. The plate may be flat. The pivot axis may pass through the plate. The pivot joint may pass through an aperture in the plate.

The hay rake may include two wing assemblies, one of which is mounted to be extendable from a left side of the central frame and the other of which is mounted to be extendable from a right side of the central frame, where the wings of the two wing assemblies may form a V-shaped arrangement when each of the wing assemblies is in the outward position.

The angle of the wing may be adjustable, where the fixed position of the wing may be selected from a range of positions. The wing may be fixed in the fixed position by inserting a fastener through a fastening hole in an extension of the wing and through a fastening hole in the arm.

The hay rake may include a plurality of rake wheel attachment arms rotatably coupled to the wing. The arms may be arranged to couple the plurality of hay rake wheels to the wing. The hay rake may also include a plurality of springs, where each of the plurality of springs couples a respective one of the plurality of rake wheel attachment arms to the wing to provide individual spring support to each of the plurality of hay rake wheels.

The hay rake may include a posterior support arm that is vertically rotatably attached to the central support frame, where the posterior support arm is arranged to support a posterior rake wheel. The hay rake may also include a rear actuator arranged to lower and raise the posterior support arm. The hay rake may include a spring arranged to support the posterior support arm.

The hay rake may include a connecting rod rotatably mounted at a first end to the central frame, where the connecting rod in a first position is configured to attach at a second end to a pin extending from the wing assembly to secure the wing assembly in the upward position and in a second position is configured to attach at the second end to a pin extending from the central frame.

According to another example embodiment of the present invention, a hay rake includes: a central frame; at least two wheels attached to the central frame; a tow bar attached to the central frame and extending in a frontward direction from the central frame; and a wing assembly including an arm coupled to the central frame by a double axis hinge defining two pivot axes about which the wing assembly is rotatable with respect to the central frame, a wing coupled in a fixed position to an end of the arm opposite the pivot joint such that the only degree of freedom between the wing and the central frame is rotation about the pivot axes, the wing being arranged for mounting a plurality of hay rake wheels along a length of the wing, and an arm actuator mount fixedly coupled to the arm, the arm actuator being a linear actuator. The hay rake includes a wing actuator having a first end coupled to the arm actuator mount and a second end coupled to the central frame, the actuator arranged to actuate the wing assembly between an outward position and an upward position. The wing is horizontal and angled outwardly in the frontward direction when the wing assembly is in the outward position, and the joint is arranged such that the wing is moved into a position horizontal and parallel to the forward direction by the linear actuation of the arm actuator.

According to yet another example embodiment of the present invention, a hay rake includes: a central frame; at least two wheels attached to the central frame; a tow bar attached to the central frame and extending in a frontward direction from the central frame; and a wing assembly including an arm coupled to the central frame at a pivot joint which allows the wing assembly to rotate with respect to the central frame, and a wing coupled to an end of the arm opposite the pivot joint, the wing being arranged for mounting a plurality of hay rake wheels along a length of the wing. The wing assembly also includes an actuator mount coupled to the arm, the actuator mount being configured to couple to an actuator arranged to cause rotation of the wing assembly about the pivot joint between an outward position and an upward position, and a spring hook coupled to the arm. The hay rake further includes a spring structure coupled to the central frame and including a spring and an engagement element, where the spring applies resistance when the engagement element is moved with respect to the central frame. The spring hook may be arranged to engage the engagement element when the wing assembly is moved from the upward position to the outward position so as to provide a spring force against downward rotation of the wing assembly. The engagement of the of the engagement element by the spring hook may cause the engagement element to extend away from the spring. The spring hook and the actuator mount may be integrally formed as a single piece.

According to another example embodiment of the present invention a hay rake includes: a central frame; at least two wheels attached to the central frame; a tow bar attached to the central frame and extending in a frontward direction from the central frame and a wing assembly. The wing assembly includes an arm coupled to the central frame by a pivot joint defining a pivot axis about which the wing assembly is rotatable with respect to the central frame, a wing coupled to an end of the arm opposite the pivot joint, the wing being adjustable among multiple positions by rotating the wing with respect to the arm about a wing adjustment axis wherein the wing is arranged for mounting a plurality of hay rake wheels along a length of the wing, and a wing adjustment actuator arranged to rotate the wing about the wing adjustment axis. The hay rake also includes a wing assembly actuator arranged to actuate the wing assembly between an outward position and an upward position. The wing adjustment actuator may include a hydraulic cylinder disposed between a joint on the wing and a joint on the arm. The wing adjustment axis may be vertical when the wing assembly is in the outward position. The pivot axis may skewed so as to be angled outwardly and downwardly in the frontward direction.

Further features and aspects of example embodiments of the present invention are described in more detail below with reference to the appended Figures.

BRIEF DESCRIPTION OF THE DRAWINGS

The invention will now be described in greater detail with reference to the accompanying drawings, a brief description of which follows:

FIG. 5b is a breakout view of section A of the hay rake illustrated in FIG. 5a.

FIG. 5c is a breakout view of section B of the hay rake illustrated in FIG. 5a.

DETAILED DESCRIPTION

Figure 1:
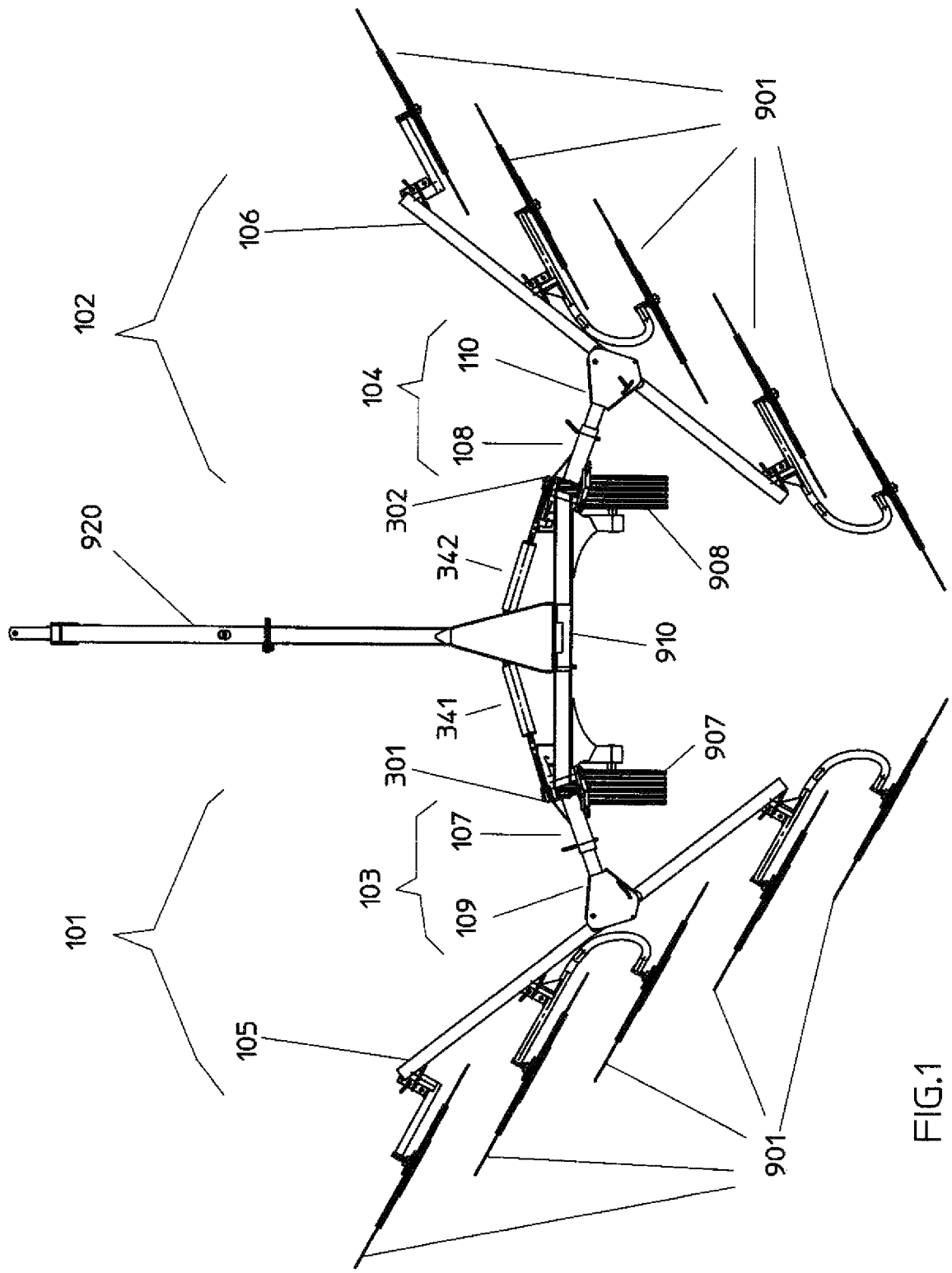
FIG. 1 is a top plan view of one embodiment of the hay rake of the present invention with rake arms in the open working position.

For ease of reference the same reference numbers are used to designate the same or corresponding elements throughout the Figures. Referring to FIGS. 1 to 5c, one exemplary embodiment of the rake of the invention includes a central frame 910, which includes a transverse member 911, equipped with a tow bar 920 that extends in a frontward direction and roller wheels 907 and 908.

A "T"-shaped adjustable hay rake arm or wing assembly 101, 102 is rotatably connected to either end of the transverse member 911. The "T"-shaped adjustable rake arms 101, 102 are composed of extendible arm sections 103 and 104 and mobile wings or wing sections 105 and 106. Each of the extendible sections 103 and 104 of the respective rake arms 101 and 102, is composed of a first longitudinal section 107, 108 and a second longitudinal section 109, 110. The first and second longitudinal sections are configured so that they slide telescopically with respect to one another. Each of the first longitudinal sections 107 and 108 is equipped with a principal fastening hole 451, 452, and each of the second longitudinal sections 109 and 110 is equipped with a plurality of fastening holes 453, 454 so that a fastening key 455, 456 may be inserted simultaneously through both the principal fastening hole 451, 452 and one of the plurality of fastening holes 453, 454 in order to secure the length of the rake arm. Each of the mobile wing sections 105 and 106 is connected in a crosswise manner to its respective second longitudinal sections 109 and 110, so that each pivots around its respective shaft or linchpin 111, 112. Each of the second longitudinal sections, 109 and 110, is equipped with a principal fastening hole 461, 462. Each of the mobile wing sections are equipped with a plurality of fastening holes 457, 458, so that fastening key 463, 464, may be inserted simultaneously through both the principal fastening hole 461, 462 and one of the plurality of fastening holes, 457, 458 in order to secure the desired angle of the mobile wing with respect to the extendible section of the rake arm, thereby providing the wing 105, 106 with a fixed position with respect to the extendible section of the rake arm. One or more hay raking wheels 901 are mounted along the length of each mobile wing section 105, 106.

Figure 14:
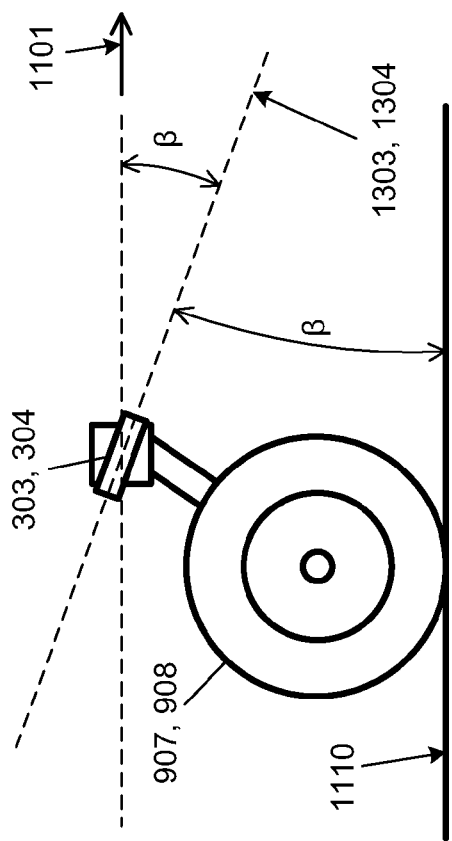
FIG. 14 is a right side view schematically illustrating the hay rake of the present invention.
Figure 13:
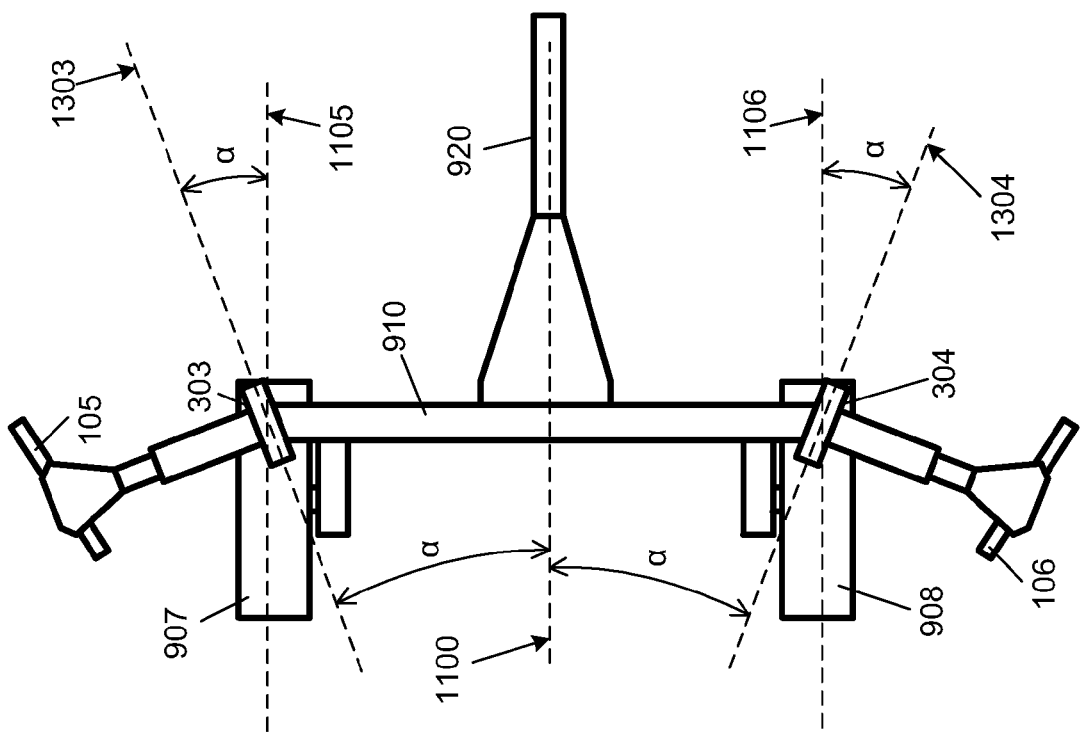
FIG. 13 is a top view schematically illustrating the hay rake of the present invention.
Figure 15:
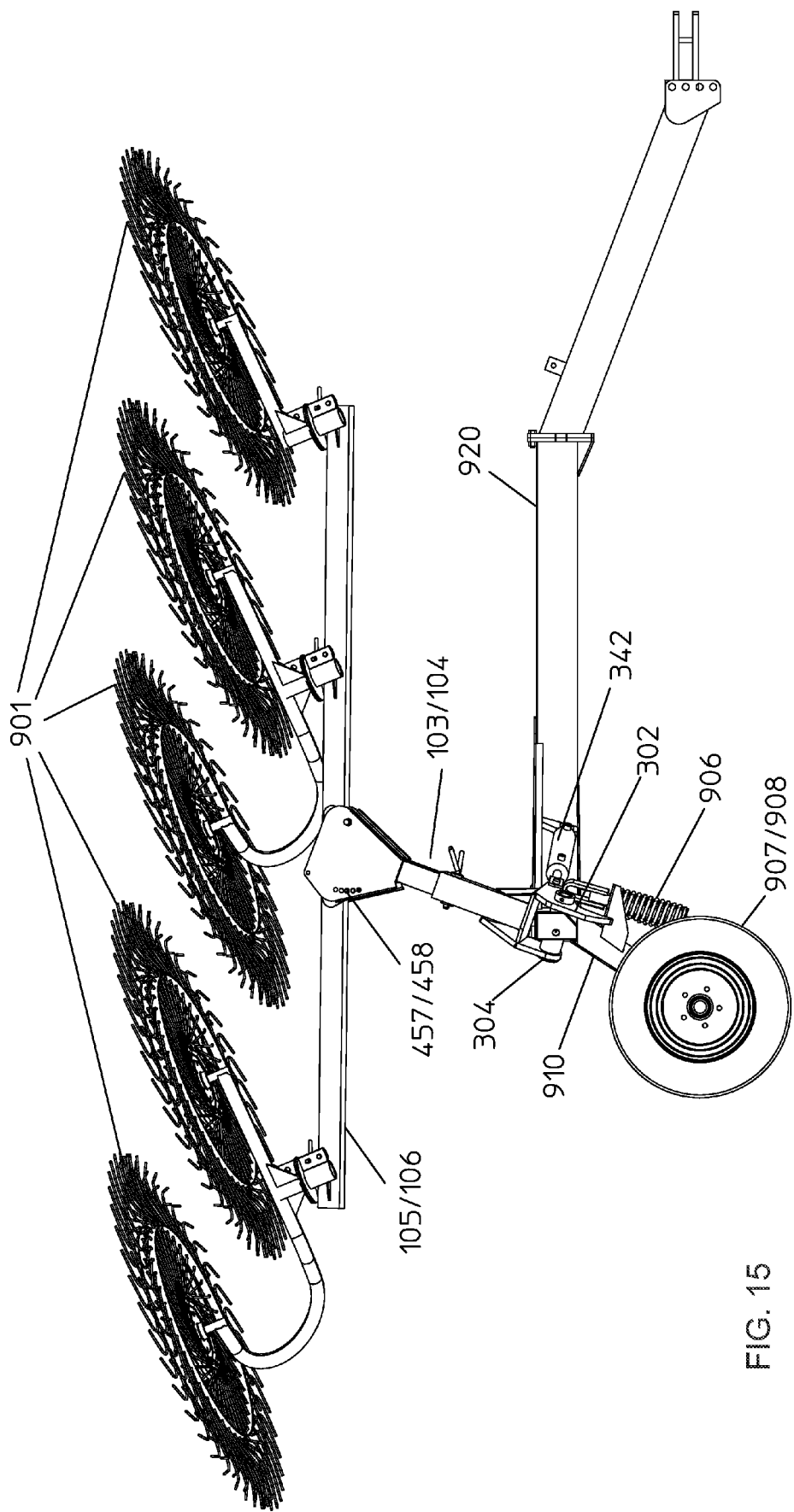
FIG. 15 is a right side view of the hay rake illustrated in FIG. 3.
Figure 16:
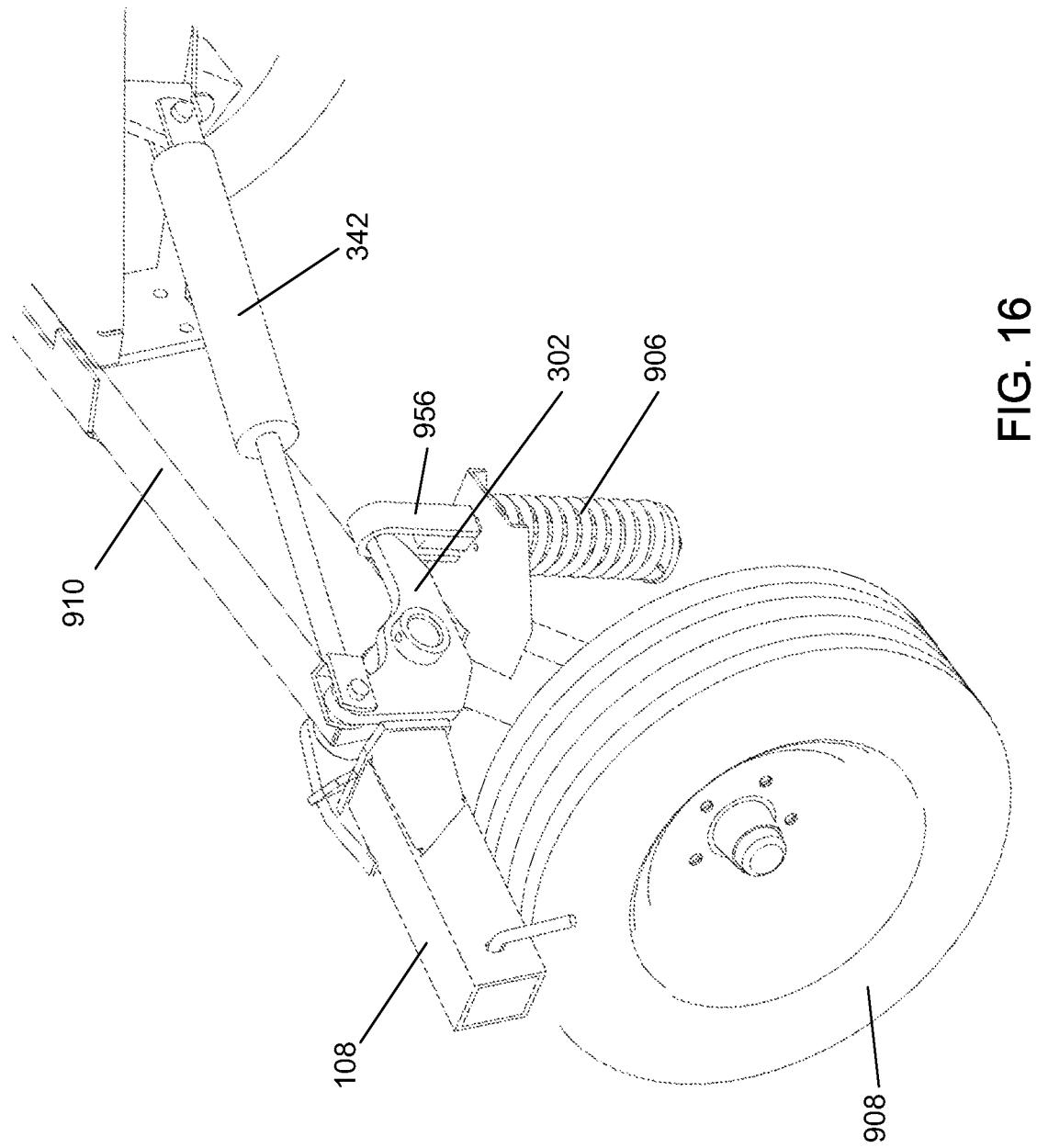
FIG. 16 is a perspective view of a portion of the right side of the hay rake illustrated in FIG. 1.

In one arrangement, a master support plate 301, 302 which pivots around a shaft or linchpin 303, 304 is provided for each rake arms 103, 104. The first part 107, 108 of the extendible arm section 103, 104 is fixedly attached to the support plate 301, 302 such that the arm section 103, 104 rotates together with the support plate 301, 302 about the shaft. Preferably, the linchpin 303, 304 is set at an angle that allows the rake arm to rotate downwards, backwards, and outwards to attain the working position or upwards, inwards, and forwards to attain the transport position. Referring to FIGS. 13 and 14, this orientation of the linchpin 303, 304 provides an axis of rotation 1303, 1304 that is angled when viewed from above, as illustrated in FIG. 13, and from the side, as illustrated in FIG. 14. When viewed from above, the axis of rotation 1303, 1304 forms an angle α with a centerline 1100 of the central frame 910, the centerline 1100 being oriented along the frontward direction 1101 of the rake. The frontward direction is the direction in which the hay rake is pulled via the tow bar 920 when the hay rake is pulled in a straight line. The centerline 1100 is parallel to reference line 1105, 1106 that runs through the joint formed by shaft or linchpin 303, 304. The axis of rotation 1303, 1304, when viewed from above, is angled in an outward direction as it progresses in the frontward direction 1101 away from the linchpin 303, 304. In this manner, the axis of rotation 1303, 1304 forms the angle α as shown in FIG. 13.

Referring to FIG. 14, the axis of rotation 1303, 1304 is also angled downwardly at an angle β as the axis progress in the frontward direction 1101 of the rake. The angle β is formed between the axis of rotation 1303, 1304 and the ground or surface 1110 on which the hay rake is towed. The angle β is also formed between the axis of rotation 1303, 1304 and the frontward direction 1101, which is parallel to the ground 1110.

As a result of the angles α and β formed by the axis of rotation 1303, 1304, the axis of rotation 1303, 1304 intersects the vertical plane containing the centerline 1100 at a point that is rearward and above the joint formed by the linchpin 303, 304. It is this skewed orientation that allows the wing section 105, 106 to be transferred from (a) an outward position where the wing section 105, 106 is angled outwardly in the forward or frontward direction 1101 while being simultaneously parallel to the ground 1110; to (b) an upward position where the wing section 105, 106 is parallel to the centerline 1100 while being simultaneously parallel to the ground 1110. This may be accomplished despite the only degree of freedom between the wing section 105, 106 and the central frame 910 being the single axis of rotation 1303, 1304 provided by the joint formed by the linchpins 303, 304.

The angle α is selected from the range of 14 to 24 degrees, more preferably 16 to 22 degrees, and most preferably 18 to 20 degrees, e.g., 19 degrees. The angle β is selected from the range of 10 to 20 degrees, more preferably 12 to 18 degrees, and most preferably 14 to 16, e.g., 15 degrees. Although the angles α and β as illustrated are fixed, it should be appreciated that, according to other examples, the angles α and β may be adjustable. The angles 19 degrees and 15 degrees for α and β, respectively, may be well-suited where the wing is at a 30 degree angle from the forward direction (i.e., where the wings form a "V" shape of 60 degrees) when the wing is in the outward position.

The central frame 910 includes oblong holes 349. An actuator 341, e.g., a linear actuator such as a hydraulic or pneumatic cylinder, with connecting shaft or linchpin 347 is connected to the central frame 910 by inserting the connecting linchpin 347 through apertures in a first clevis of the actuator 341 and through the oblong hole 349 which is positioned in the first clevis. The actuator 341 is connected at its opposite end to an arm actuator mount 321 that is formed as an arm or extension of the support plate 301. This connection is provided by connecting a second shaft or linchpin 345 through apertures in a second clevis of the actuator 341 and through a hole in the actuator mount 321 to thereby form a joint that is at a radial distance from the axis of rotation of the wing assembly 101 about the shaft 303. This distance provides a lever arm such that the actuator 341 may provide a torque to the plate 301 and thereby actuate the wing assembly 101 between an outward position, shown, e.g., in FIG. 2, and an upward position, shown, e.g., in FIG. 3. The central frame 910 also includes oblong hole 350. An actuator 342, e.g., a hydraulic or pneumatic cylinder, with connecting shaft or linchpin 348 is connected to the oblong hole 350 of central frame with linchpin 348 and to an actuator mount 322 of support plate 302 with a connecting shaft or linchpin 346. In this regard the actuation of the wing assembly 102 is the same or a mirror-image of that described above with respect to wing assembly 101.

Spring 905 has a first end 951 coupled to the central frame 910 and a second end 953 coupled to an engagement element 955, e.g., an eye bolt or a hook, by rod 957 that passes through spring 905. Spring 906 has a first end 952 coupled to the central frame 910 and a second end 954 coupled to an engagement element 956 by rod 958 that passes through spring 906. A spring hook 401 is attached to support plate 301 and engages eye bolt 955, and a spring hook 402 is attached to support plate 302 and engages eye bolt 956. Although the engagement elements 955 and 956 are eye bolts, it should be appreciated that the engagement elements may be any appropriate structure, e.g., a hook, for engaging the spring hooks 401 and 402. Although the springs 905 and 906 are coil springs, any appropriate type of spring may be provided, including, e.g., a spring arm, that is engaged by the spring hook 401.

Figure 6:
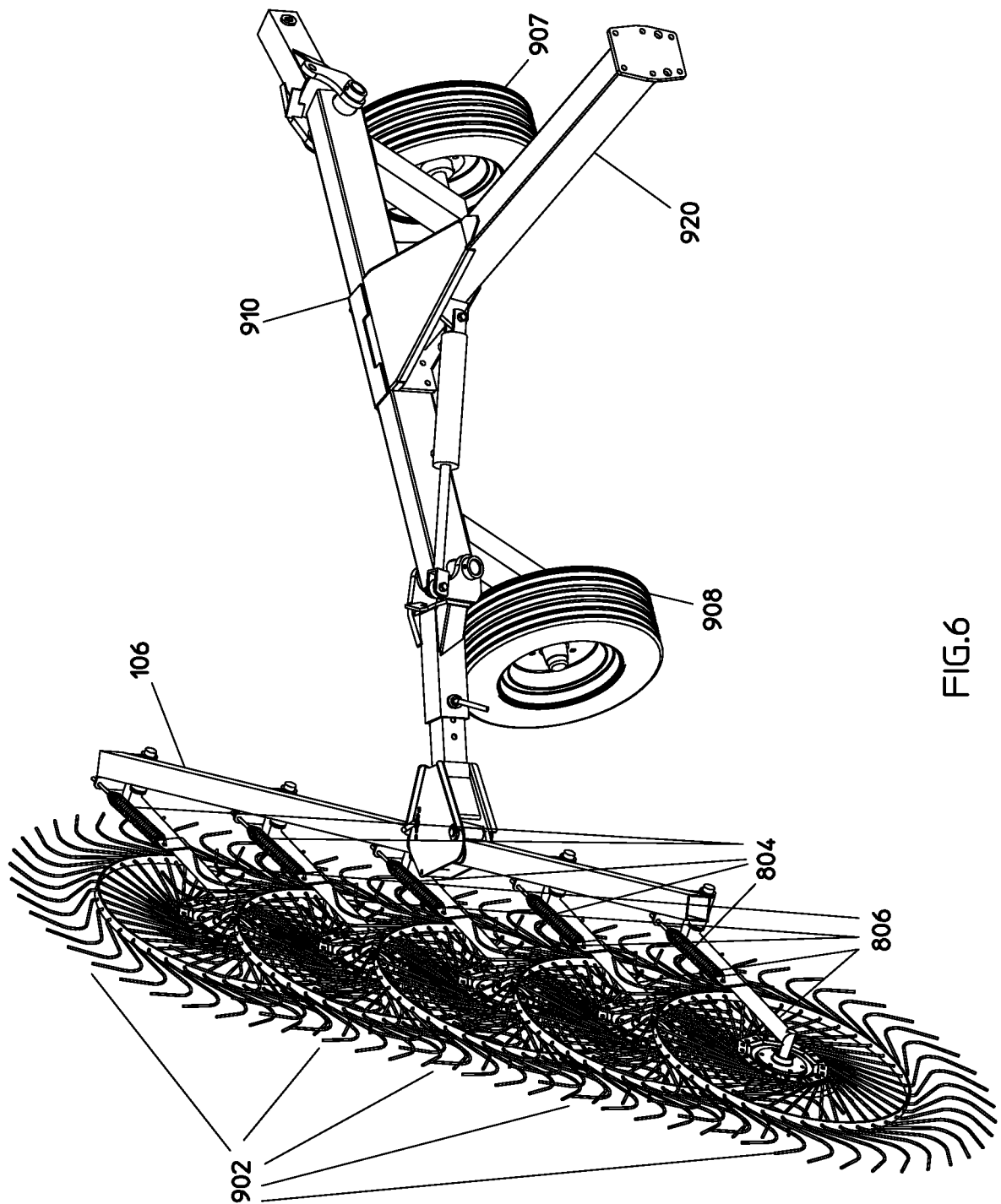
FIG. 6 is a perspective view showing another embodiment of the hay rake of the present invention.

Referring to FIG. 6, which for reasons of clarity depicts only half of another exemplary embodiment of the rake of this invention, rake wheel pivoting or attachment arms 806 are pivotally attached to mobile wing section 106. Preferably, springs 804 are attached to mobile wing section 106 and arms 806. Hayraking wheels 902 are mounted on hay rake wheel pivoting arms 806 and springs 804 together provide individual spring support for each of hay making wheels 902 individually.

Figure 7:
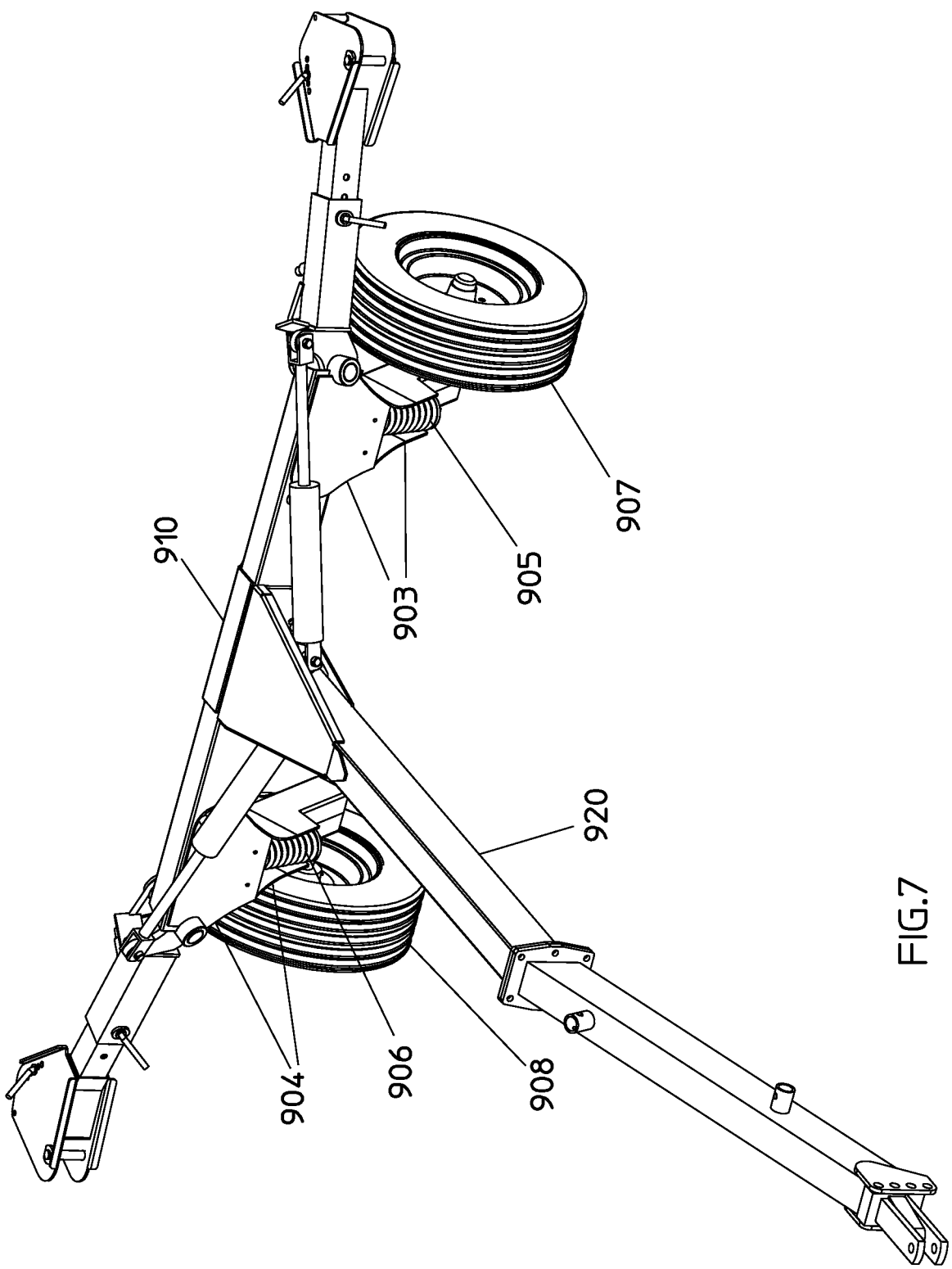
FIG. 7 is a perspective view showing the details of yet another embodiment of the hay rake of the present invention.

FIG. 7 shows another exemplary embodiment of the hay rake of the present invention in which protective housings 903 and 904 cover springs 905 and 906. The hydraulic power, drive, and command lines of hydraulic cylinder 341 and hydraulic cylinder 342 are not depicted. However, those of ordinary skill in the art would recognize that such lines often present in machines of this type and would be well aware of many suitable types that could be used.

When hydraulic cylinders 341 and 342 are elongated the support plates 301 and 302 pivot downwards around linchpins 303 and 304, bringing the adjustable hay rake arms 101 and 102 to a lowered or outward position for work. Simultaneously hooks 401 and 402 engage eye bolts 955 and 956, subjecting the movement of master support plates 301 and 302 and, therefore, wing assemblies 101 and 102 to the effect of springs 905 and 906. In this position the presence of oblong holes 349 and 350 allows support plates 301 and 302 and wing assemblies 101 and 102 to make small rotational movements so that the wing assemblies 101 and 102 adapt better to irregularities of the soil without disturbing the actuators 341 and 342, e.g., hydraulic cylinders. The presence of springs 905 and 906 counters the weight of wing assemblies 101 and 102 and thus reduces their weight on the ground. When actuators 341 and 342 are contracted, support plates 301 and 302 pivot upwards around linchpins 303 and 304, bringing the adjustable hay rake arms 101 and 102 to a raised position for transport and storage.

The length and angle of the adjustable hay rake arms in the working position can be adjusted as needed by adjusting the lengths of extendible sections 103 and 104, and by adjusting the angles of the mobile wing sections 105 and 106. Once the appropriate position is determined, the rake arms are set at the desired length using fastening keys 455 and 456. Fastening key 455 is inserted through both fastening hole 451 and the appropriate fastening hole of the plurality of fastening holes 453, and fastening key 456 is inserted through both fastening hole 452 and the appropriate hole of the plurality of fastening holes 454 depending on the desired length. The angles of the wing sections 105 and 106 are adjusted by rotating the wing around shafts or linchpins 109 and 110, respectively, to the desired angle. The desired angle is then set by inserting the fastening key 463 through both fastening hole 461 and the appropriate fastening hole of the plurality of fastening holes 457, and inserting fastening key 464 through both fastening hole 462 and the appropriate fastening hole of the plurality of fastening holes 458, depending on the desired angle, thereby securing each of the wing sections 105 and 106 in a fixed position.

Although the fixed position may be adjusted, the range of adjustment may be such that any of the fixed positions results in the wing sections 105 and 106 being substantially horizontal and substantially parallel to the forward direction, i.e., the direction in which the rake is towed, when in the upward position.

It is also possible to have springs 804 provide individual spring support for each of the haymaking wheels 902, as well as including protective housings 903 and 904 to cover springs 905 and 906.

Figure 8:
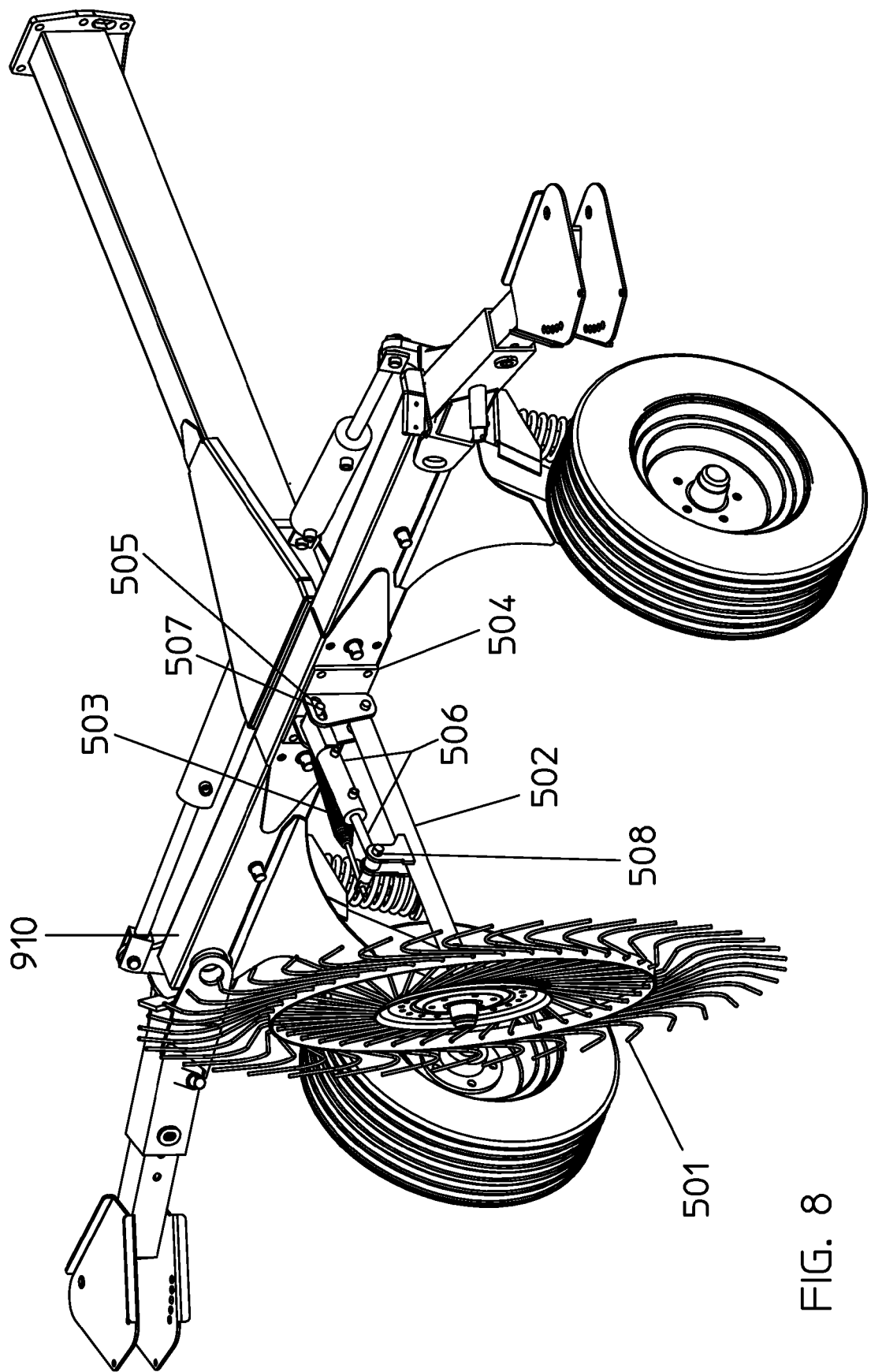
FIGS. 8 and 9 are perspective views of another embodiment of the hay rake of the present invention.
Figure 9:
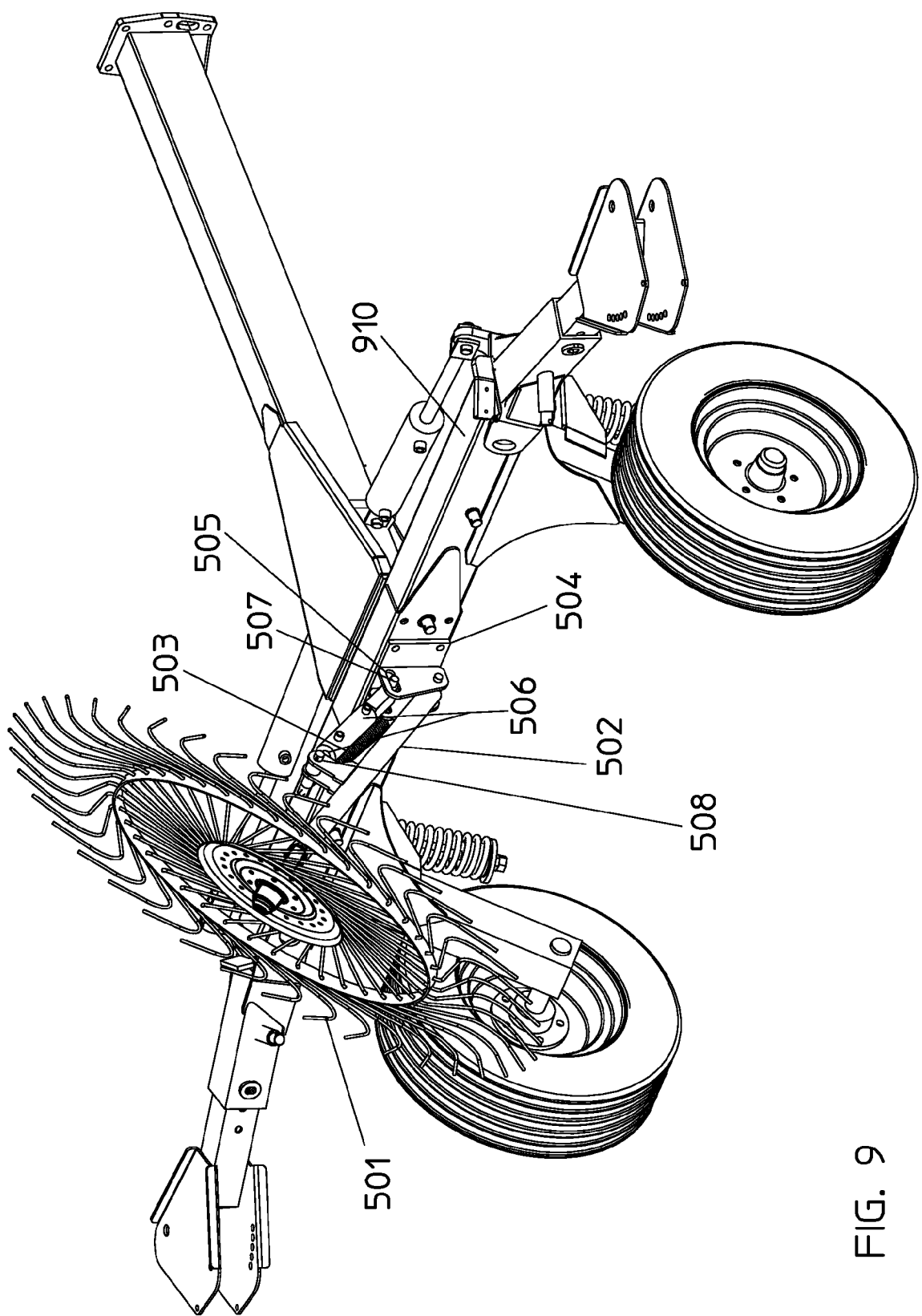

Referring to FIGS. 8 and 9, another example hay rake has an applications plate 504 applied to the middle portion of the central frame 910, the movable rear arm, posterior rake wheel support arm 502 is vertically rotatably connected to the applications plate 504. A central posterior rake wheel 501 is applied to the rear movable arm. A spring 503 is connected to the movable rear arm 502 and the applications plate 504. An oblong hole 505 is provided in the applications plate 504 together with piston and hydraulic cylinder 506, which connects pin 507 threaded in oblong hole 505 and joint 508 on the movable rear arm.

This additional hay rake wheel in the center rear position may further rake the hay already raked by the rake wheels attached to the two wing assemblies 101 and 102. The center rear rake wheel 501 can be lowered into the working position as shown in FIG. 8 or raised into the transport position as shown in FIG. 9 by extension or contraction of the rear actuator 506, e.g., a piston and hydraulic cylinder assembly. Spring 503 counters the weight of the central rear hay rake wheel 501 and thus reduces its weight on the ground. Furthermore, in the working position, the presence of oblong hole 505 allows the movable rear arm 502 to make small rotational movements thus better adapting the position of the movable rear rake arm and the central rear hay rake wheel 501 to the irregularities of the ground without affecting the piston and hydraulic cylinder assembly 506.

Figure 10:
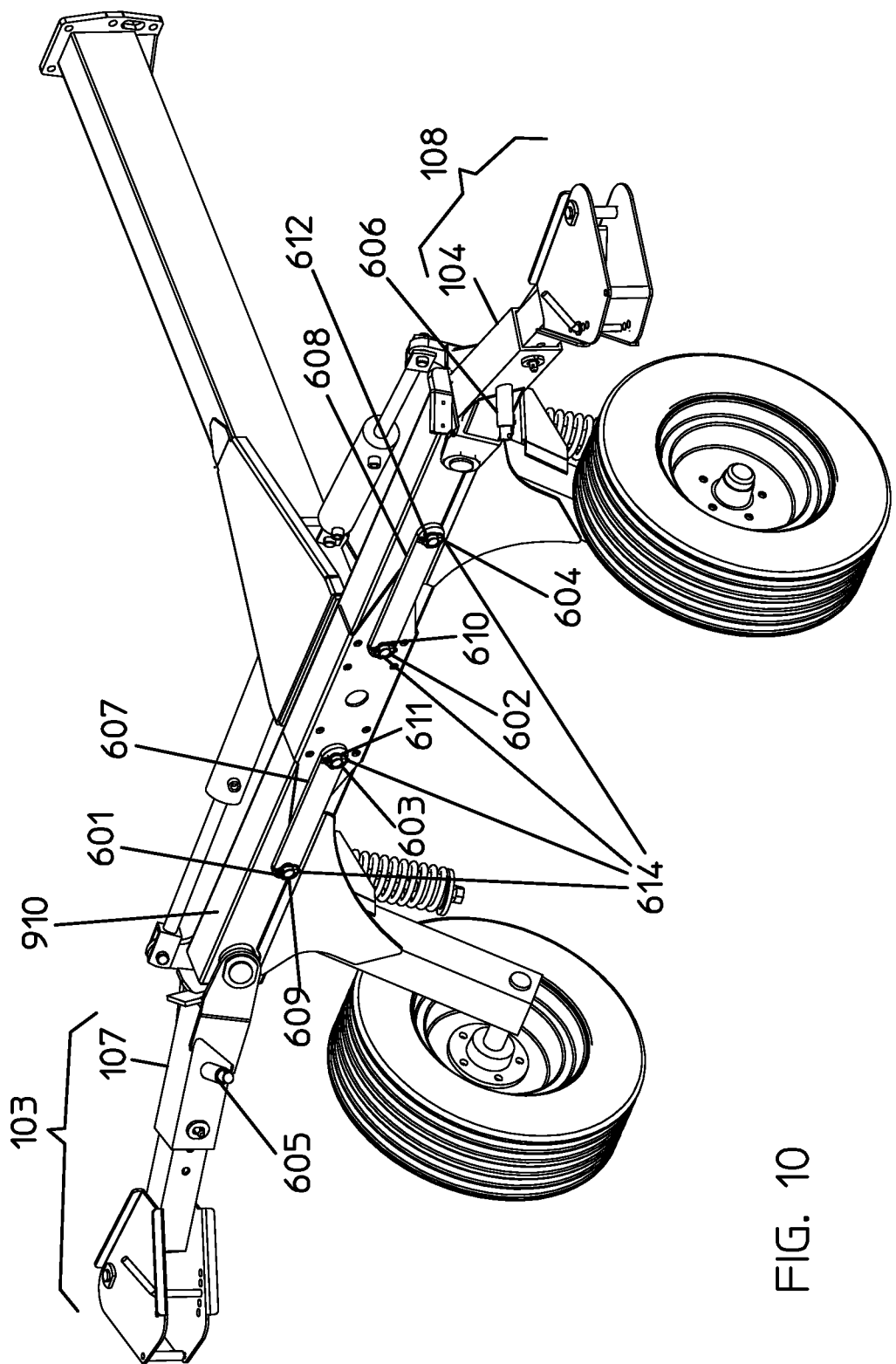
FIGS. 10 to 12 are perspective views of another embodiment of the hay rake of the present invention.
Figure 11:
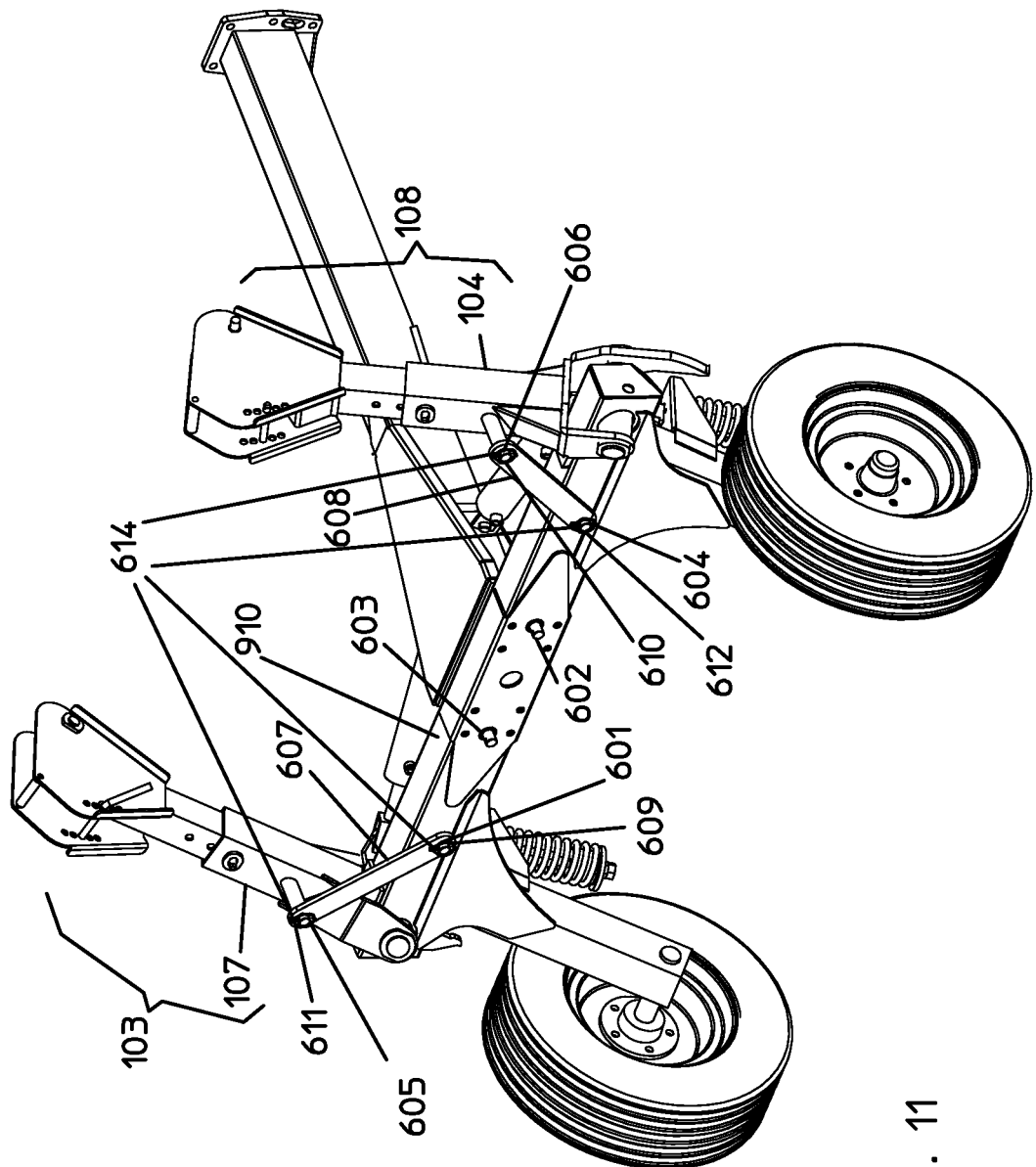
Figure 12:
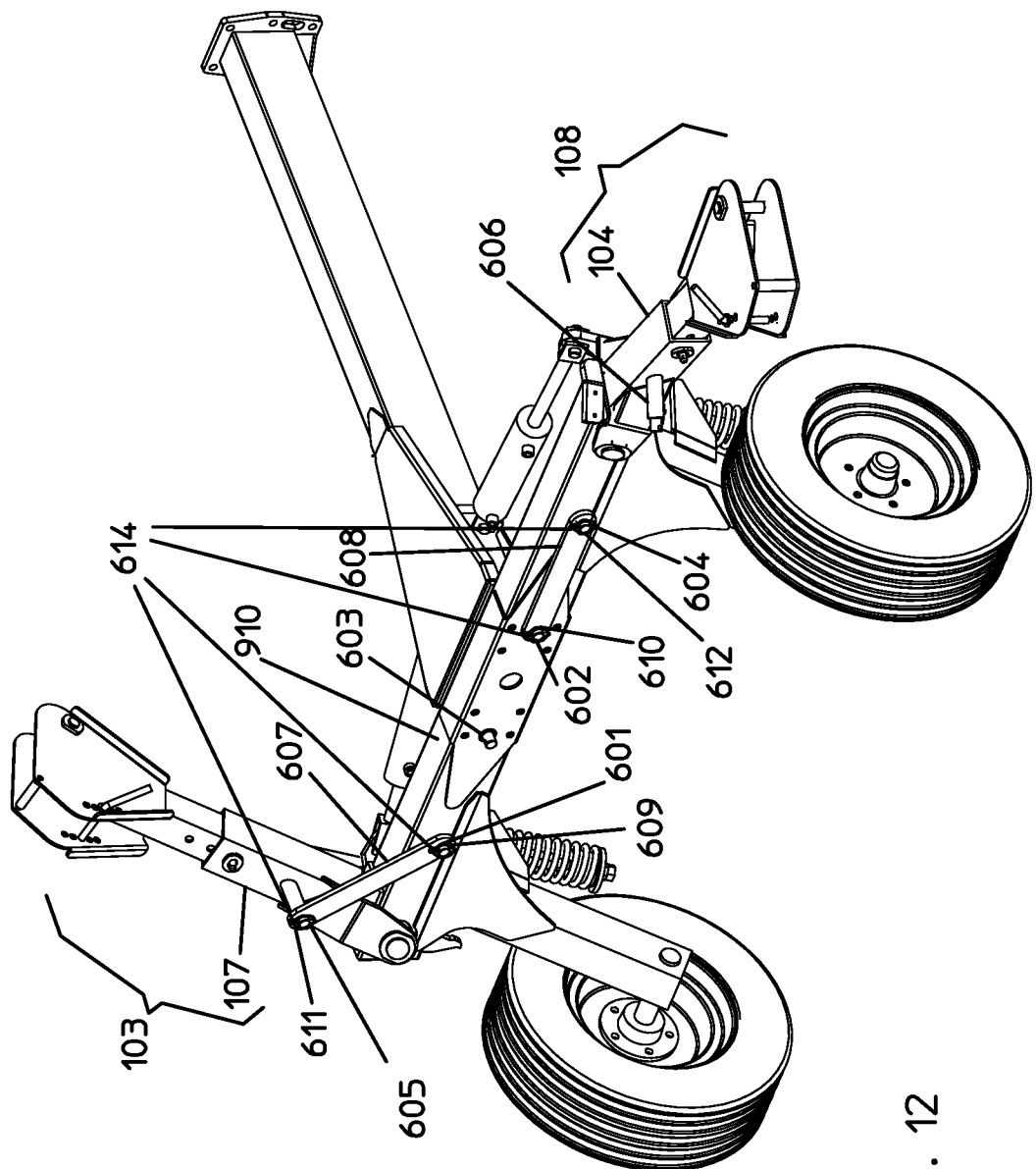

Referring to FIGS. 10 to 12, which relate to another example of the invention, protruding pins 601 and 603 are provided on the central frame member 910 and protruding pin 605 is provided on the first longitudinal section of the extendible arm section 103.

Protruding pins 602 and 604 are provided on the central frame member 910 and protruding pin 606 is provided on the first longitudinal section of the extendible arm section 104. A connecting rod 607 having at its two extremities holes 609 and 611 adapted to engage pins 601, 603 and 605, and a connecting rod 608 having at its two extremities holes 610 and 612 adapted to engage pins 602, 604 and 606 are provided. All the protruding pins are provided with safety plugs designed to hold the connecting rods 607 and 608 in place.

The connecting rods 607 and 608 operate as follows. When the rake arms 103 and 104 are raised in the transport position as shown in FIG. 11, connecting rod 607 is positioned so that protruding pin 601 is in hole 609 and the protruding pin 605 is in hole 611 and connecting rod 608 is positioned so that protruding pin 604 is in hole 612 and the protruding pin 606 is in hole 610. In this way whatever movement, even accidental, of the rake arms 103 and 104 is prevented due to the connecting arms 607 and 608. When the rake arms are lowered in the working position, however, as shown in FIG. 10, the connecting rod 607 is positioned so that protruding pin 601 is in hole 609 and protruding pin 603 is in hole 611 and connecting rod 608 is positioned so that protruding pin 602 is in hole 6010 and protruding pin 604 is in hole 612. In this way the connecting rods 607 and 608 do not interfere with the movement of the rake arms 103 and 104. Alternatively, when one connecting rod is fixed in one position and the other is fixed in the other position, then one rake arm is blocked in the operating position while the other is free to move. This allows for a very simple and safe way to lower and use only one rake arm while the other is secure in the transport position.

Figure 2:
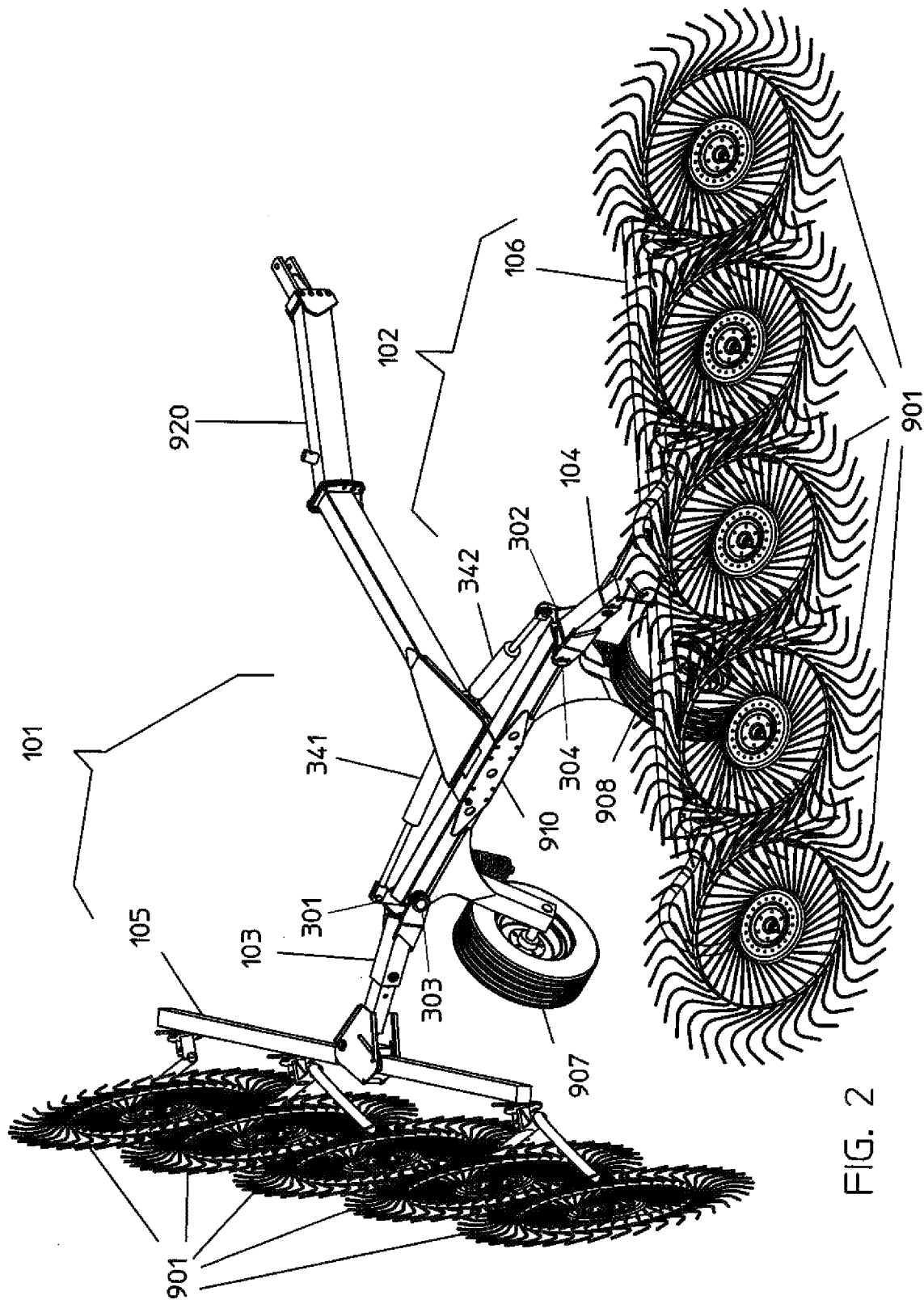
FIG. 2 is a perspective view of the hay rake of FIG. 1.
Figure 3:
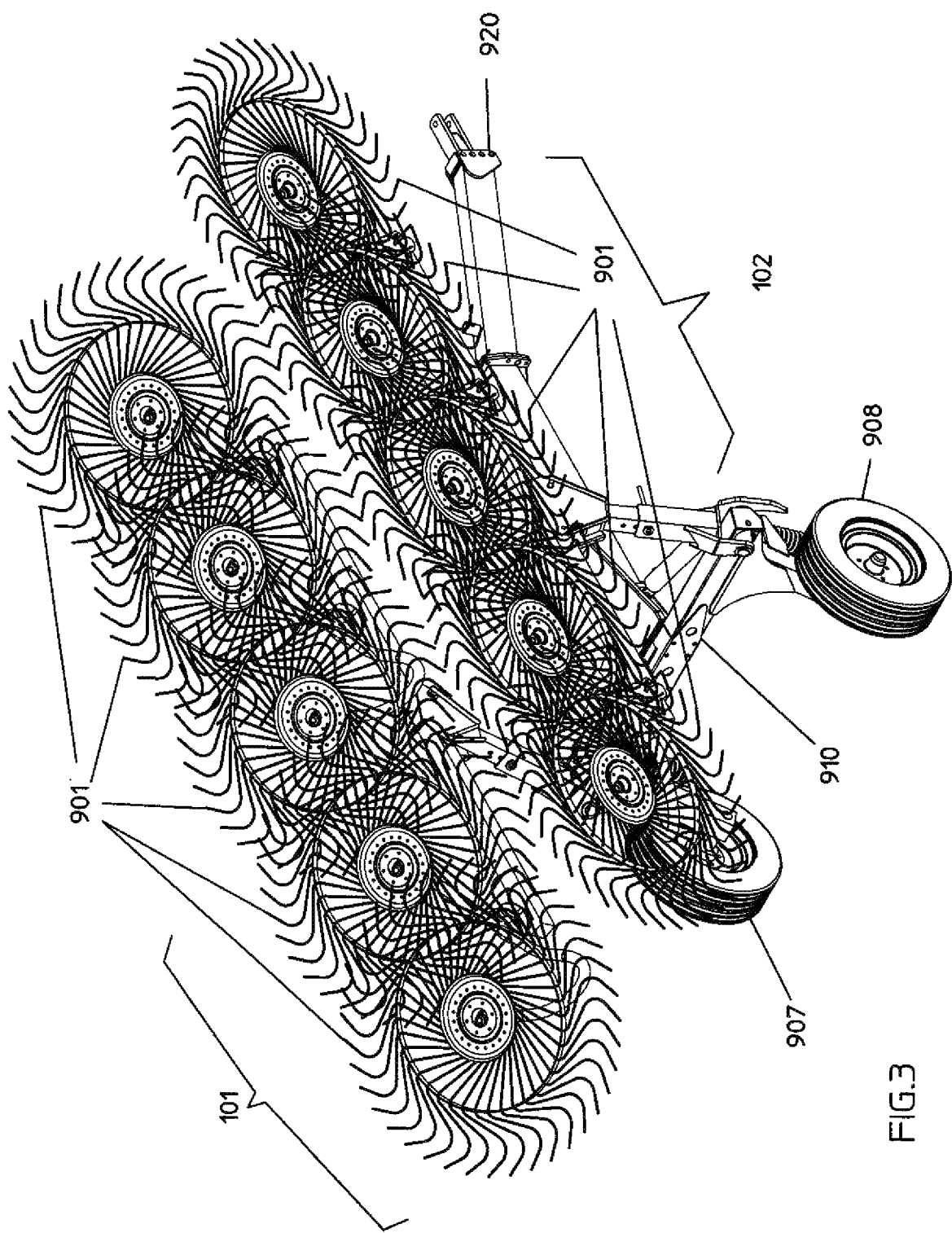
FIG. 3 is a perspective view of the hay rake of FIG. 1 with rake arms in the raised and closed transport position.
Figure 4:
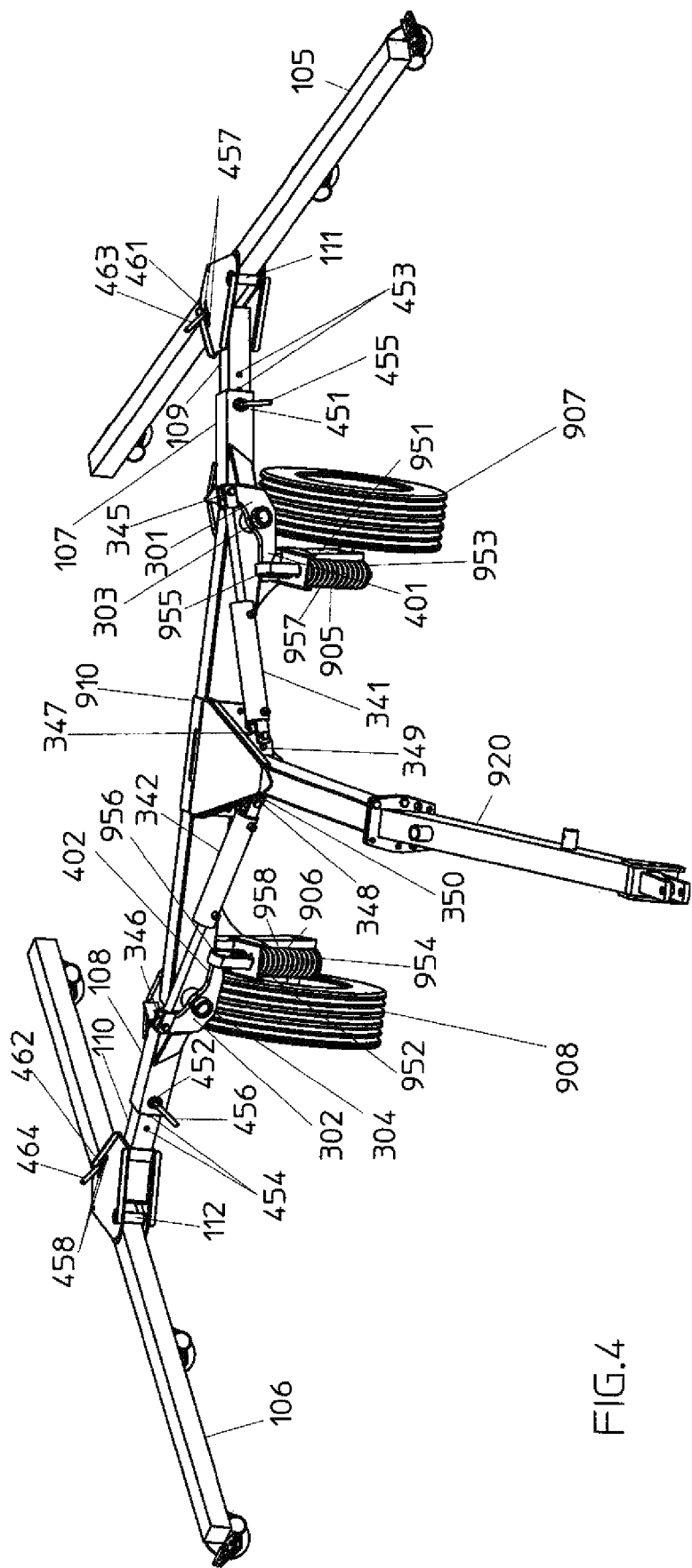
FIG. 4 is another more detailed perspective view of the hay rake of FIG. 1 (without hay rake wheels).
Figure 5A:
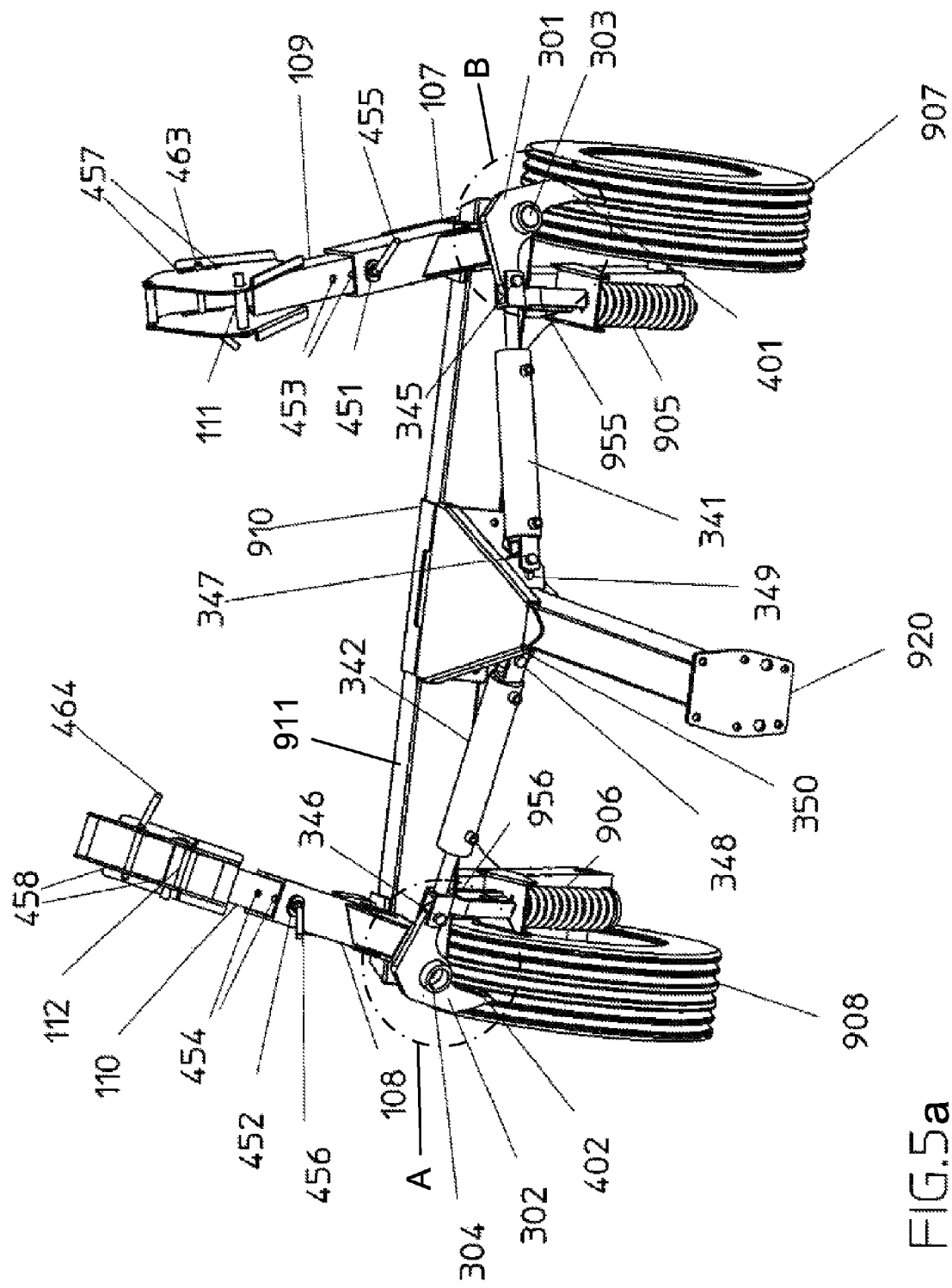
FIG. 5a is another more detailed perspective view of the hay rake of FIG. 2 with rake arms in the raised and closed transport position (without hay rake wheels).
Figure 17:
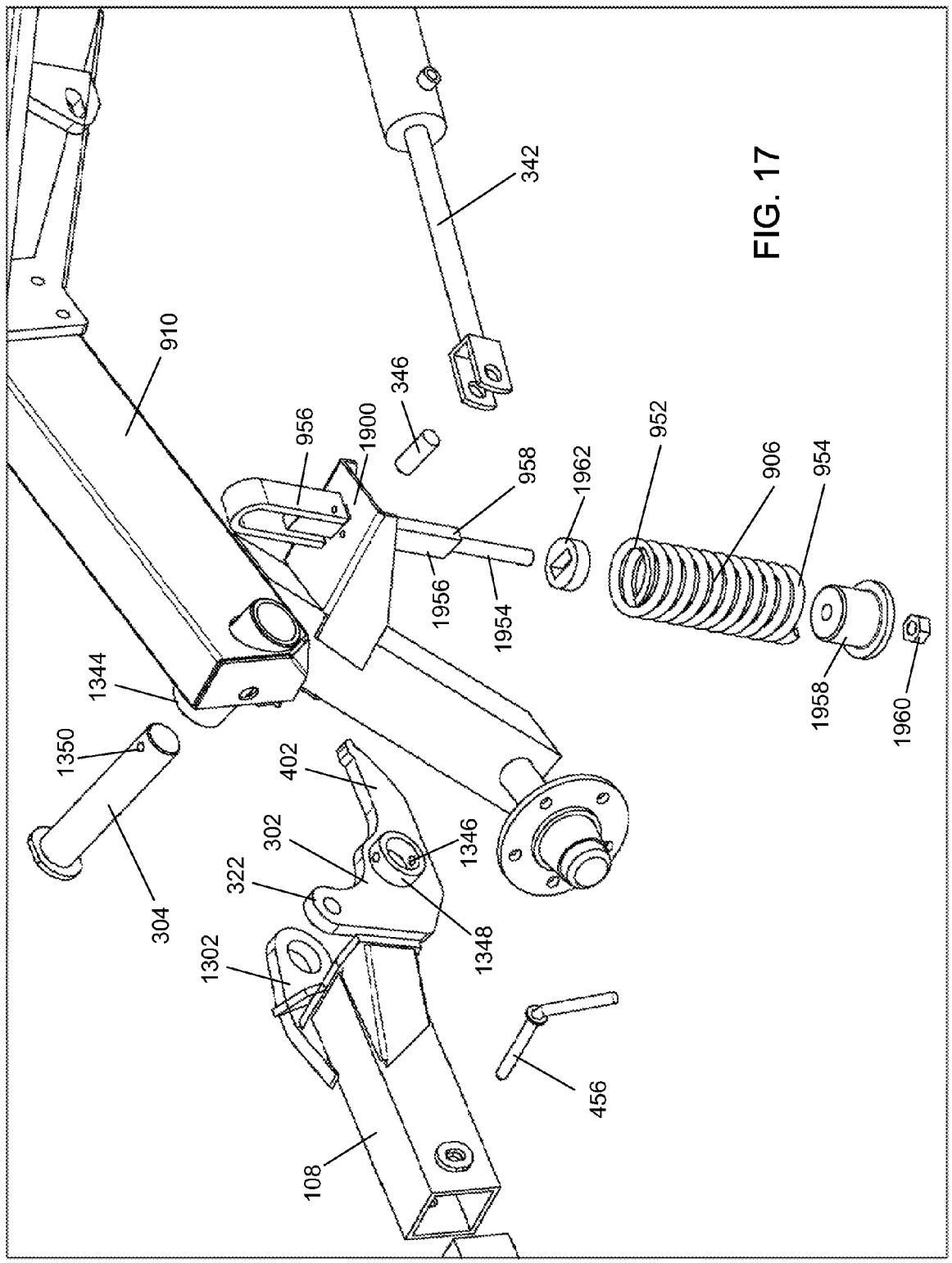
FIG. 17 is an exploded view of a portion of the right side of the hay rake illustrated in FIG. 1.
Figure 18:
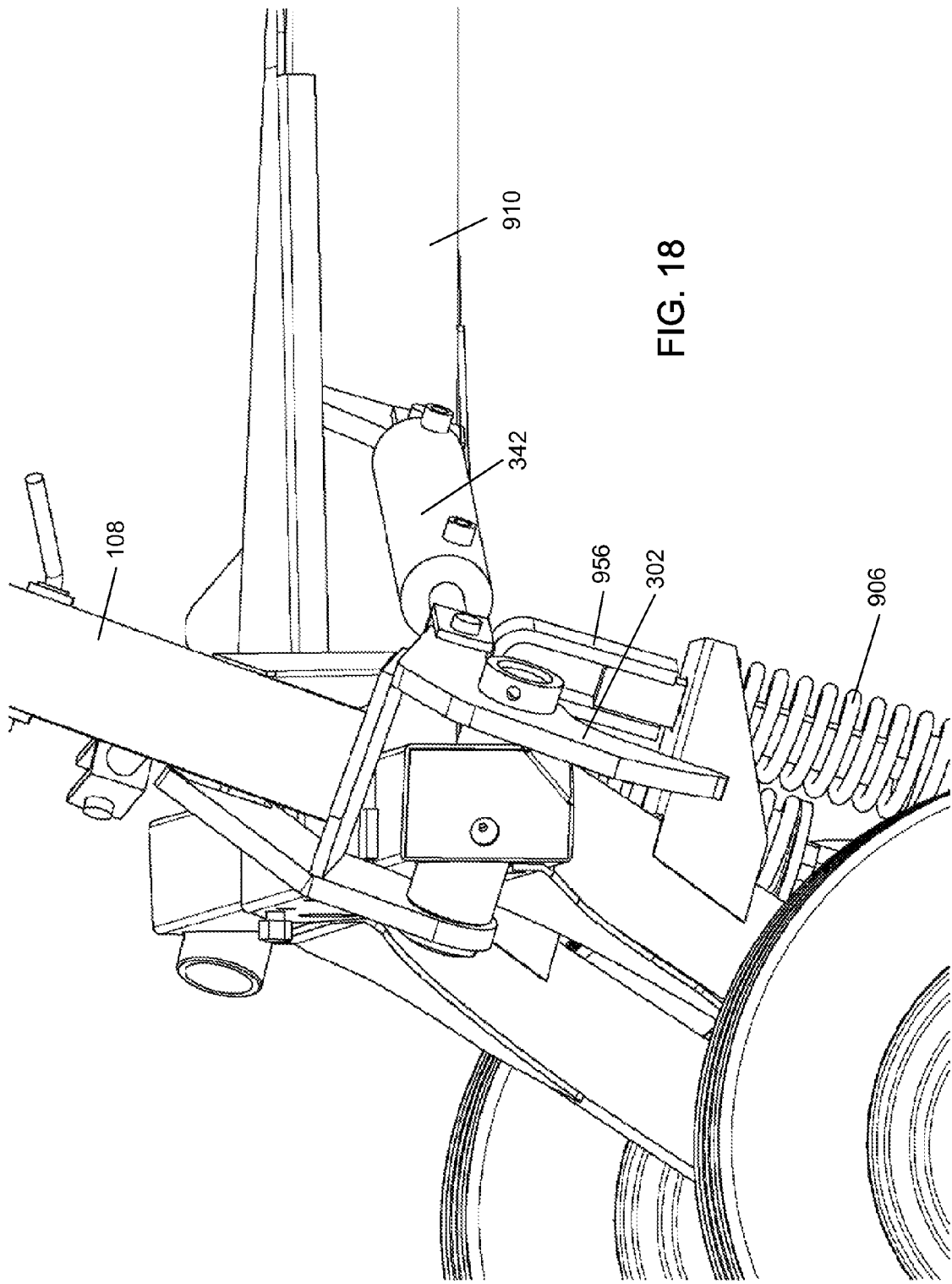
FIG. 18 is a perspective view of a portion of the right side of the hay rake illustrated in FIG. 3.
Figure 19:
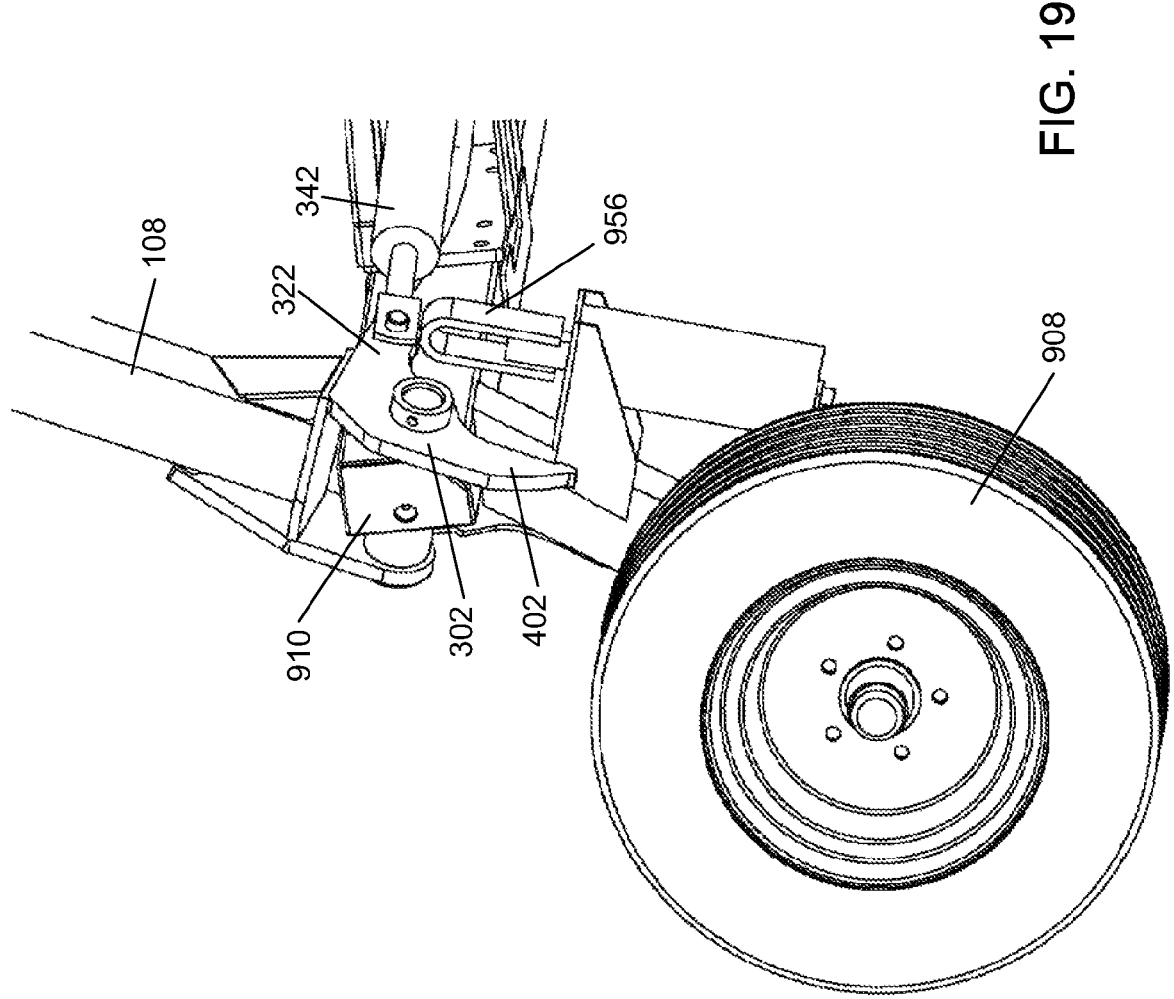
FIG. 19 is a lower perspective view of a portion of the right side of the hay rake illustrated in FIG. 3.
Figure 20:
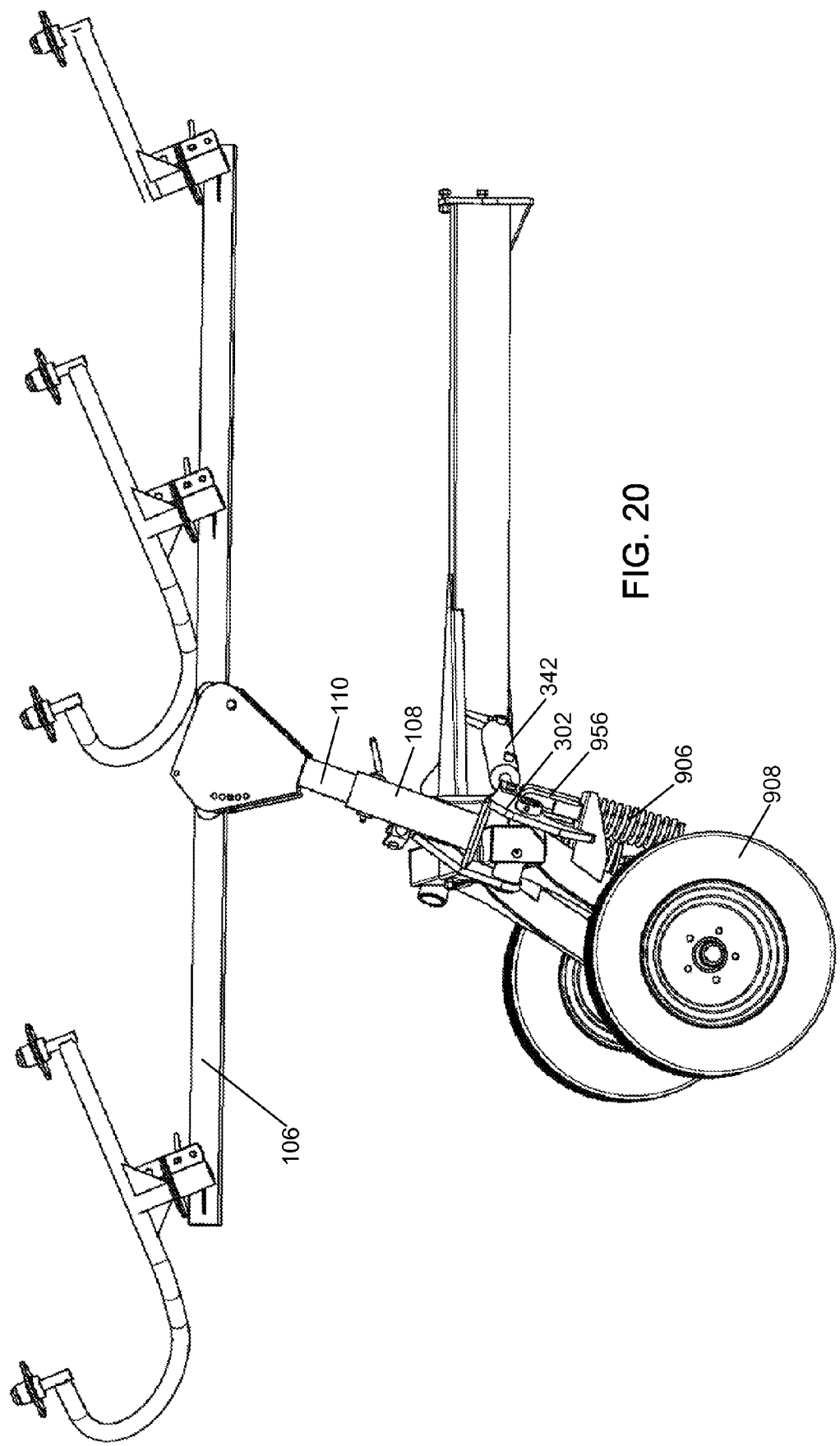
FIG. 20 is a perspective view of a portion of the hay rake illustrated in FIG. 3.

FIGS. 15 to 20 provide various views of the hay rake illustrated, e.g., in FIGS. 1 to 3. Referring to the exploded view of FIG. 17, a supplemental support plate or flange 1302 is provided on the first longitudinal section 108 opposite and parallel to the master support plate 302. In this regard, the first longitudinal section 108 is coupled to the central frame 910 such that respective apertures in the supplemental support plate 1302 and the master support plate 302 align with opposite ends of a rotation support sleeve 1344 of the central frame 910. After this alignment, the rotation shaft or linchpin 304 is inserted through the supplemental support plate 1302, the sleeve 1344, and the master support plate 302. The shaft or linchpin 304 is then secured in its axial position by inserting a pin (not shown) through transverse holes 1346 of a flange 1348 and a transverse hole 1350 of the shaft 304. Although the flange 1348 illustrated in FIG. 17 is fixed to the master support plate 302, e.g., by welding, it should be appreciated that the flange 1348 may be separate from the master support plate 302. Further, although the shaft 304 is arranged so as to rotate with the first longitudinal section 108 about the sleeve 1344, it should be appreciated that the shaft 304 may be arranged to be rotationally stationary with respect to the sleeve 1344 such that the first longitudinal section 108 rotates with respect to the shaft 304 about the axis of the shaft 304. Rotation of the longitudinal section 108 may occur via a bushing, bearing, or any other appropriate mechanism.

When the components are assembled, the first end 952 of the spring 906 is coupled to the central frame 910 and the second end 954 of the spring 906 is coupled to the engagement element 956 by rod or shaft 958 that passes through the spring 906. The first end 952 couples to a lower surface of a spring support plate or flange 1900 of the central frame 910. The spring support plate has an aperture through which the rod or shaft 958 passes, while an engagement structure (in this case a loop) extends above the spring support plate or flange 1900. To maintain the orientation of the engagement structure, the rod or shaft 958 is keyed within the spring support plate or flange 1900. In this example, the rod or shaft 958 has a rectangular cross section in an upper region 1956 that passes through a rectangular aperture in the spring support plate or flange 1900. Thus, the engagement element 956 is maintained at a proper angle to be engaged by the spring hook 402 of the master support plate 302. The spring 906 is secured at its lower end 954 by an end cap 1958 that includes a flange arranged to axially constrain the spring 906. A lower portion 1954 of the rod or shaft 958 extends through the end cap 1958. A nut 1960 is applied to a threaded end of the lower portion 1954 to axially secure the end cap 1958 on the lower portion 1954. Because the lower portion 1954 has a different cross section (in this example, circular) than the upper portion 1956, the upper section 1956 serves as a positive stop when attaching the end cap 1958, thus eliminating any uncertainty with respect to the axial position of the end cap 1958 when tightening the nut 1960. In this regard, the upper portion 1954, with its rectangular cross section, performs a dual function in that it rotationally keys the engagement element 956 with respect to the spring support plate or flange 1900, while also providing a positive stop against which the end cap 1958 may be tightened via the nut 1960.

When the spring hook 402 engages the loop of the engagement element 956, the engagement element 956 is pulled upwardly, which causes the rod or shaft 958 to translate upwardly, along with the end cap 1958, with respect to the spring support plate or flange 1900. This upward translation causes the spring 906 to be compressed between the flange of the end cap 1958 and the lower surface of the spring support plate or flange 1900. The range of travel may be limited when the spring is compressed by a spacer 1962, which forms a positive or hard stop between an upper surface of the end cap 1958 and the bottom surface of the spring support plate or flange 1900. Alternatively, the spacer may be omitted such that the top surface of the end cap 1958 may contact the lower surface of the spring support plate 1900 to form a positive or hard stop. The fully extended position of the spring 906 is controlled by a positive or hard stop between the engagement element 956 and an upper surface of the spring support plate or flange 1900. In this manner, the range of travel of engagement element 956 with respect to the spring support plate 1900 may be provided. The spring may be preloaded or at a rest state when in the fully extended position.

Figure 21:
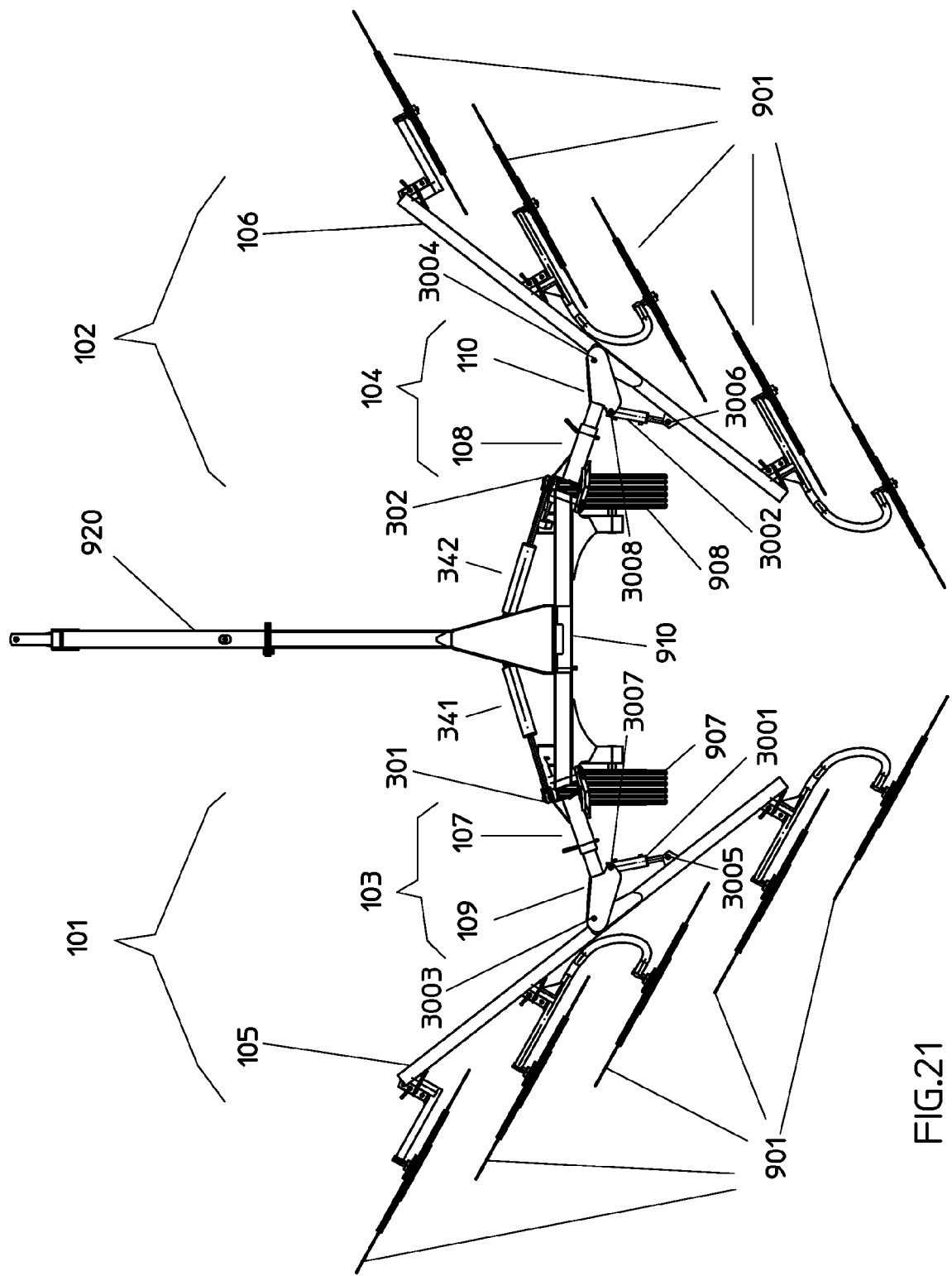
FIG. 21 is a top view of another embodiment of a hay rake of the present invention.

FIG. 21 illustrates another embodiment of the hay rake according to the present invention. The hay rake shares many features with the embodiments described above and illustrated in FIGS. 1 to 20. The hay rake of FIG. 21 differs, however, in that it includes wing actuators 3001 and 3002 mounted to the wings 105 and 106. A pivot 3003 about which the wing section 105 rotates with respect to the second longitudinal section 109 of the extendible arm section 103 is illustrated. Also illustrated is a pivot 3004 about which the wing section 106 rotates with respect to the second longitudinal section 110 of the extendible arm section 104. The actuator 3001, e.g., a hydraulic cylinder/piston assembly, connects the joint 3005 on the wing section 105 to the joint 3007 on the second longitudinal section 109 of the extendible arm 103. The wing actuator 3002, e.g., a hydraulic cylinder/piston assembly, connects the joint 3006 on the wing section 106 to the joint 3007 on the second longitudinal section 110 of the extendible arm 104. The operation of the embodiment represented in this figure is as follows: when hydraulic cylinder/piston assembly 3001 is elongated or retracted, wing 105 rotates one way or another around the hinge 3003 with respect to the second longitudinal section 109 of the extendible arm 103 and when hydraulic cylinder/piston assembly 3001 remains fixed, second longitudinal section 109 of the extendible arm also remains fixed. The same happens with wing section 106 under the action of hydraulic cylinder/piston assembly 3002. In this way the working position of wing sections 105 and 106 is regulated by the actions of the hydraulic cylinder/piston assemblies 3001 and 3002. This may be particularly advantageous because adjustment of the operating angle of wings 105 and 106 can be carried out by the simple action of the actuator commands, e.g., hydraulic commands, quickly and at a safe distance, directly by the operator of the machine without the operator having to get out of the vehicle, e.g., tractor. This mechanism even allows adjustment of the wings 105 and 106 while the hay rake is in operation.

It should be appreciated that although the actuators, e.g., cylinder/piston assemblies, illustrated in FIG. 21 are disposed rearward of the pivots 3003 and 3004, the actuators may be disposed forward of the hinges or pivots 3003 and 3004. It should be further appreciated that although the hinges 3003 and 3004 provide rotation axes that are vertical when the wing assemblies are in the outward position, the rotation axes may be non-vertical.

The actuators 3001 and 3002 allow the wings 105 and 106 to be easily adjusted to a horizontal position when in an upward position. In this regard, it is possible to dispense with the skewed rotation of axes of the wing assemblies 101 and 102 where, e.g., parallel, horizontal rotation axes are provided. However, it may be advantageous to maintain the skewed axes in order to limit the necessary stroke of the actuators 3001 and 3002, as the actuators 3001 and 3002 could then be used for the minor adjustments while the rotation about the skewed axes accounts for the wings 105 and 106 being in a substantially parallel and horizontal upward position.

Although the examples shown in the Figures utilize a joint with a single axis of rotation, it should be appreciated that other types of joints may be provided. For example, the double axis hinge described, e.g., at col. 8, lines 25 to 52 of U.S. Pat. No. 6,000,207, which is expressly incorporated herein in its entirety by reference thereto, may be provided. In this manner, the joint may have two axes of rotation. The hinge or joint allows the wing to be moved into a position horizontal and parallel to the forward direction by a single linear actuator.

Compared to prior art hay rakes, the hay rake of the present invention may be advantageous in that it is both very effective and easily adjusted. It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents. Moreover, the features described herein may be used in any combination.

What is claimed is:

1. A hay rake comprising:
    a central frame;
    a wing assembly coupled to the central frame, the wing assembly including an arm coupled to the central frame,
    a wing supported by the arm,
    a plurality of hay raking wheels, and
    a plurality of pivoting arms, each of the pivoting arms coupling a respective hay raking wheel to the wing such that each of the hay raking wheels is pivotable with respect to the wing independently of each of the other hay raking wheels, wherein:
    the hay rake further includes at least two wheels attached to the central frame;
    the hay rake further includes a tow bar attached to the central frame and extending in a frontward direction from the central frame;
    the arm is coupled to the central frame by a pivot joint defining a pivot axis about which the wing assembly is rotatable with respect to the central frame, the arm being adjustable among multiple fixed lengths,
    the wing is coupled to an end of the arm opposite the pivot joint, the wing being adjustable among multiple fixed positions by rotating the wing with respect to the arm about a wing adjustment axis, wherein the only degree of freedom between the wing and the central frame is rotation about the pivot axis when the arm is in any one of its fixed lengths and the wing is in one of its fixed positions, and wherein the wing is arranged for mounting the plurality of hay raking wheels along a length of the wing;
    the wing assembly further includes an arm actuator mount fixedly coupled to the arm;
    the hay rake further includes a wing actuator having a first end coupled to the arm actuator mount and a second end coupled to the central frame, the actuator arranged to actuate the wing assembly between an outward position and an upward position; and
    the hay rake further includes a spring structure arranged to engage the wing assembly when the wing assembly is in the outward position so as to apply a spring force against downward rotation of the wing assembly about the arm pivot axis;
    wherein:
        the spring structure includes a spring and an engagement element, the spring coupled to the central frame and the engagement element, wherein the wing assembly further includes a spring hook arranged to engage the engagement element when the wing assembly is moved from the upward position to the outward position,
        the wing is horizontal and angled outwardly in the frontward direction when the wing assembly is in the outward position, and
        the pivot axis is skewed such that the wing is horizontal and parallel to the forward direction when the wing assembly is in the upward position.

2. The hay rake according to claim 1, wherein the engagement of the of the engagement element by the spring hook pulls the engagement element in a direction away from the spring.

3. The hay rake according to claim 1, wherein the spring hook and the arm actuator mount are integrally formed as a single piece.

4. The hay rake according to claim 3, wherein the spring hook and the arm actuator mount are formed as a plate.

5. The hay rake according to claim 4, wherein the plate is flat.

6. The hay rake according to claim 4, wherein the pivot axis passes through the plate.

7. The hay rake according to claim 6, wherein the pivot joint passes through an aperture in the plate.

8. The hay rake according to claim 1, wherein the engagement element is an eye bolt.

9. The hay rake according to claim 1, wherein the hay rake includes two wing assemblies, one of which is mounted to be extendable from a left side of the central frame and the other of which is mounted to be extendable from a right side of the central frame, the wings of the two wing assemblies forming a V-shaped arrangement when each of the wing assemblies is in the outward position.

10. The hay rake according to claim 1, wherein the angle of the wing is adjustable, the fixed position of the wing being selected from a range of positions.

11. The hay rake according to claim 10, wherein the wing is fixed in the fixed position by inserting a fastener through a fastening hole in an extension of the wing and through a fastening hole in the arm.

12. The hay rake according to claim 1, further comprising:
    a plurality of rake wheel attachment arms rotatably coupled to the wing, the arms configured to couple the plurality of hay rake wheels to the wing; and
    a plurality of springs, each of the plurality of springs coupling a respective one of the plurality of rake wheel attachment arms to the wing thereby providing individual spring support to the plurality of hay rake wheels.

13. The hay rake according to claim 1, further comprising:
    a posterior support arm vertically rotatably attached to the central support frame, the posterior support arm configured to support a posterior rake wheel; and
    a rear actuator arranged to lower and raise the posterior support arm.

14. The hay rake according to claim 13, further comprising a spring arranged to support the posterior support arm.

15. The hay rake according to claim 1, further comprising:
    at least one connecting rod rotatably mounted at a first end to the central frame, wherein the at least one connecting rods in a first position are configured to attach at a second end to a pin extending from the wing assembly to secure the wing assembly in the upward position and in a second position are configured to attach at the second end to a pin extending from the central frame.

16. The hay rake according to claim 1, wherein the pivot axis, when projected onto a horizontal plane, forms a first angle with the forward direction, and wherein the pivot axis, when projected onto a vertical plane oriented along the forward direction, forms a second angle with a ground surface when the hay rake is towed.

17. The hay rake according to claim 16, wherein the first angle is within a range of 16 to 22 degrees and the second angle is within a range of 12 to 18 degrees.

18. The hay rake according to claim 16, wherein the first angle is within a range of 18 to 20 degrees and the second angle is within a range of 14 to 16 degrees.

19. A hay rake comprising:
   a central frame;
   at least two wheels attached to the central frame;
   a tow bar attached to the central frame and extending in a frontward direction from the central frame; and
   a wing assembly including:
      an arm coupled to the central frame by a pivot joint defining a pivot axis about which the wing assembly is rotatable with respect to the central frame,
      a wing coupled to an end of the arm opposite the pivot joint, the wing being adjustable among multiple positions by rotating the wing with respect to the arm about a wing adjustment axis wherein the wing is arranged for mounting a plurality of hay rake wheels along a length of the wing,
      a wing adjustment actuator arranged to rotate the wing about the wing adjustment axis; and
      a wing assembly actuator arranged to actuate the wing assembly between an outward position and an upward position;
      wherein the pivot axis is skewed so as to be angled outwardly and downwardly in the frontward direction.

\* \* \* \* \*